United States Patent
Chen et al.

(10) Patent No.: US 11,396,103 B2
(45) Date of Patent: Jul. 26, 2022

(54) METHOD AND APPARATUS FOR MANIPULATING A TOOL TO CONTROL IN-GRASP SLIDING OF AN OBJECT HELD BY THE TOOL

(71) Applicant: SAMSUNG ELECTRONICS CO., LTD., Suwon-si (KR)

(72) Inventors: Yuan Chen, Long Island City, NY (US); Colin Prepscius, Brooklyn, NY (US); Dae Won Lee, Princeton, NJ (US); Ibrahim Volkan Isler, Saint Paul, MN (US); Daniel Dongyuel Lee, Tenafly, NJ (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 221 days.

(21) Appl. No.: 16/926,289

(22) Filed: Jul. 10, 2020

(65) Prior Publication Data

US 2021/0283785 A1 Sep. 16, 2021

Related U.S. Application Data

(60) Provisional application No. 62/987,789, filed on Mar. 10, 2020.

(51) Int. Cl.
*B25J 13/08* (2006.01)
*B25J 9/16* (2006.01)
(Continued)

(52) U.S. Cl.
CPC ............ *B25J 13/084* (2013.01); *B25J 9/161* (2013.01); *B25J 9/1651* (2013.01); *B25J 9/1653* (2013.01);
(Continued)

(58) Field of Classification Search
CPC ........ B25J 13/084; B25J 9/161; B25J 9/1651; B25J 9/1653; B25J 9/1697; B25J 13/082;
(Continued)

(56) References Cited

U.S. PATENT DOCUMENTS 4,912,519 A * 3/1990 Yoshida .................. G01P 3/806
356/28
7,127,326 B2 * 10/2006 Lewis ..................... B25J 19/021
901/1
(Continued)

FOREIGN PATENT DOCUMENTS

CN 102652270 A * 8/2012 ............... G01D 3/08
JP 2005-177977 A 7/2005
(Continued)

OTHER PUBLICATIONS

Yuan Chen et al. "Tactile Velocity Estimation for Controlled In-Grasp Sliding" International Conference on Intelligent Robots and Systems, 2020, (8 pages total).
(Continued)

*Primary Examiner* — B M M Hannan
(74) *Attorney, Agent, or Firm* — Sughrue Mion, PLLC

(57) ABSTRACT

A tool control system may include: a tactile sensor configured to, when a tool holds a target object and slides the target object downward across the tool, obtain tactile sensing data from the tool; one or more memories configured to store a target velocity and computer-readable instructions; and one or more processors configured execute the computer-readable instructions to: receive the tactile sensing data from the tactile sensor; estimate a velocity of the target object based on the tactile sensing data, by using one or more neural networks that are trained based on a training image of an sample object captured while the sample object is sliding
(Continued)

down; and generate a control parameter of the tool based on the estimated velocity and the target velocity.

20 Claims, 14 Drawing Sheets

(51) Int. Cl.
  *B25J 15/08* (2006.01)
  *B25J 11/00* (2006.01)
(52) U.S. Cl.
  CPC ........... *B25J 9/1697* (2013.01); *B25J 13/082* (2013.01); *B25J 13/087* (2013.01); *B25J 15/08* (2013.01); *B25J 11/008* (2013.01)
(58) Field of Classification Search
  CPC ........ B25J 13/087; B25J 15/08; B25J 11/008; B25J 9/1612; B25J 9/163; B25J 13/083; G05B 2219/39271; G05B 2219/39507; G05B 2219/40567; G05B 2219/40625
  USPC .................................................. 700/258–259
  See application file for complete search history.

(56) References Cited

U.S. PATENT DOCUMENTS

| | | |
|---|---|---|
| 8,935,004 B2 | 1/2015 | Iida |
| 9,144,908 B2 | 9/2015 | Saen et al. |
| 2014/0214209 A1 * | 7/2014 | Sugiura .................. B25J 9/1612 310/322 |
| 2014/0365009 A1 * | 12/2014 | Wettels .................. B25J 13/082 700/258 |
| 2020/0301510 A1 * | 9/2020 | Birchfield ............... G01L 5/226 |
| 2022/0107715 A1 * | 4/2022 | Rosenberg .............. G06F 3/042 |

FOREIGN PATENT DOCUMENTS

| | | | | |
|---|---|---|---|---|
| JP | 2006-321015 A | 11/2006 | | |
| JP | 2007-253266 A | 10/2007 | | |
| JP | 2009-69028 A | 4/2009 | | |
| JP | 4344798 B2 * | 10/2009 | | |
| JP | 5177560 B2 * | 4/2013 | ............ | G06F 3/016 |
| JP | 5810582 B2 | 10/2015 | | |
| JP | 6640792 B2 * | 2/2020 | ............ | B25J 13/082 |
| WO | WO-2014201163 A1 * | 12/2014 | ............ | B25J 13/082 |

OTHER PUBLICATIONS

International Search Report (PCT/ISA/210) and Written Opinion (PCT/ISA/237) dated Jan. 20, 2021 issued by the International Searching Authority in International Application No. PCT/KR2020/013931.

* cited by examiner

METHOD AND APPARATUS FOR MANIPULATING A TOOL TO CONTROL IN-GRASP SLIDING OF AN OBJECT HELD BY THE TOOL

CROSS-REFERENCE TO RELATED APPLICATION

This application claims priority under 35 U.S.C. § 119 from U.S. Provisional Application No. 62/987,789 filed on Mar. 10, 2020 in the U.S. Patent & Trademark Office, the disclosure of which is incorporated herein by reference in its entirety.

FIELD

Methods and apparatuses consistent with embodiments relate to configuring a neural network to estimate an in-grasp sliding velocity and characteristics of an object that is held and slid by a tool (e.g., a robot end effector, a robot gripper, etc.) based on tactile sensing data detected from the tool and an captured image of the object, and also relate to manipulating the tool based on the estimated sliding velocity and the estimated characteristics of the object.

BACKGROUND

In-hand manipulation may be easy for humans but still challenging for robots. In humans, tactile perception provides critical feedback for grasping and manipulation. As a result, tactile sensors have become increasingly popular in robotic grippers. Existing work extensively studies grasp stability assessment, slip detection, and contact force estimation. Beyond simple feedback, such as gripping more tightly in response to detecting slip, the existing work on using tactile measurements for in-hand manipulation remains limited.

In controlling a robot arm and a robot end effector, one of the important manipulation skills is in-grasp sliding—releasing a held object from a grip in a controlled manner. This capability is useful for gentle placement in cluttered environments. The presence of obstructing items may render infeasible direct placement via pick-and-place methods. When direct placement is infeasible, a robot may still accomplish a placement task by releasing the object from its grasp and gently sliding it into place at a specified velocity.

SUMMARY

One or more embodiments provide a method and an apparatus for controlling an in-grasp sliding velocity of an object that is held by a tool (e.g., a robot end effector, a robot gripper, etc.), by using a neural network configured to estimate the velocity of the object based on tactile sensing data detected from the tool.

According to an aspect of the disclosure, there is provided a tool control system including: a tactile sensor configured to, when a tool holds a target object and slides the target object downward across the tool, obtain tactile sensing data from the tool; one or more memories configured to store a target velocity and computer-readable instructions; and one or more processors configured execute the computer-readable instructions to: receive the tactile sensing data from the tactile sensor; estimate a velocity of the target object based on the tactile sensing data, by using one or more neural networks that are trained based on a training image of an sample object captured while the sample object is sliding down; and generate a control parameter of the tool based on the estimated velocity and the target velocity.

The tactile sensing data may include at least one of an impedance value of an electrode mounted on the tool, a static pressure value that represents a force exerted to the tool by the target object, and a dynamic pressure value that represents a vibration that occurs in the tool when the target object slides across the tool.

The tool may include two fingers configured to hold and slide the target object downward over the two fingers. The control parameter may be a command value indicating a distance between the two fingers of the tool.

The tactile sensing data may include an impedance value of an electrode mounted on the tool, a static pressure value that represents a force exerted to the tool by the target object, and a dynamic pressure value that represents a vibration that occurs in the tool when the target object slides across the tool. The one or more neural networks may include: a first neural network configured to process the impedance value; a second neural network configured to process the static pressure value; a third neural network configured to process the dynamic pressure value; a concatenation layer configured to combine the processed impedance value, the processed the static pressure value, and the processed dynamic pressure value; and one or more fully connected layers configured to output the estimated velocity based on a combination of the processed impedance value, the processed the static pressure value, and the processed dynamic pressure value.

The one or more neural networks may further include: a max pooling layer provided between the third neural network and the concatenation layer to down-sample the processed dynamic pressure value, and output a down-sampling result of the processed dynamic pressure value to the concatenation layer.

The tactile sensor may include: an impedance sensor including a plurality of sensing electrodes and configured to detect an impedance value of each of the plurality of sensing electrodes; and a pressure sensor configured to detect a static pressure value that represents a force exerted to the tool by the target object, and a dynamic pressure value that represents a vibration that occurs in the tool when the target object slides across the tool.

The one or more memories may be further configured to store an activation velocity that is less than the target velocity. The one or more processors may be further configured execute the computer-readable instructions to: generate the control parameter of the tool based on the estimated velocity and the activation velocity, in a pre-sliding stage starting from a first point in time where the estimated velocity of the target object is zero, and ending at a second point in time where the estimated velocity of the target object becomes a predetermined percentage of the activation velocity; and generate the control parameter of the tool based on the estimated velocity and the target velocity, in a sliding stage starting from the second point in time, and ending a third point in time where the estimated velocity of the target object becomes the target velocity.

The tool control system may further include a vison sensor configured to capture an image of the target object. The one or more processors may be further configured execute the computer-readable instructions to: estimate a physical property of the target object based on the captured image of the target object, by using another neural network that is trained based on either one or both of depth information of the sample object and tactile sensing information of the sample object; and generate the control parameter of the tool based on the estimated physical property of the target object, the estimated velocity of the target object, and the target velocity.

The physical property of the target object may include at least one of shape, texture, material, fragility, strength, and size of the target object.

The tool may include at least one of a robot end-effector, a robot gripper, and a robot tweezer.

The one or more processors may be further configured execute the computer-readable instructions to: transmit, to the tool, the control parameter that enables the tool to gradually increase a distance between two fingers of the tool based on the control parameter, until the estimated velocity becomes the target velocity.

According to an aspect of other embodiments, there is provided a tool control method including: obtaining tactile sensing data from a tool when the tool holds a target object and slides the target object downward across the tool; estimating a velocity of the target object based on the tactile sensing data, by using one or more neural networks that are trained based on a training image of an sample object captured while the sample object is sliding down; and generating a control parameter of the tool based on the estimated velocity and a predetermined target velocity.

The tactile sensing data may include at least one of an impedance value of an electrode mounted on the tool, a static pressure value that represents a force exerted to the tool by the target object, and a dynamic pressure value that represents a vibration that occurs in the tool when the target object slides across the tool.

The control parameter may be a command value indicating a distance between two fingers of the tool configured to hold and slide the target object downward.

The tactile sensing data may include at least one of an impedance value, a static pressure value, and a dynamic pressure value detected from the tool. The one or more networks may include a first neural network, a second neural network, and a third neural network. The estimating the velocity of the target object may include: processing the impedance value, the static pressure value, and the dynamic pressure value, through the first neural network, the second neural network, and the third neural network, respectively; and obtaining the estimated velocity by processing a combination of the processed impedance value, the processed the static pressure value, and the processed dynamic pressure value, through one or more fully connected layers.

The estimating the velocity of the target object may further include: down-sampling the processed dynamic pressure value to be combined with the processed impedance value and the processed static pressure value, so that the estimated velocity is obtained from the combination of the down-sampled processed dynamic pressure value, the processed impedance value, and the processed static pressure value.

The generating the control parameter of the tool may include: entering a pre-sliding stage at a first point in time where the estimated velocity of the target object is zero; generating the control parameter of the tool based on the estimated velocity and a predetermined activation velocity that is less than the predetermined target velocity, in the pre-sliding stage starting until a second point in time where the estimated velocity of the target object becomes the predetermined activation velocity; transitioning from the pre-sliding stage to a sliding stage at the second point time; and generating the control parameter of the tool based on the estimated velocity and the predetermined target velocity, in the sliding stage until the estimated velocity of the target object becomes the predetermined target velocity.

The tool control method may further include capturing an image of the target object; estimating a physical property of the target object based on the captured image of the target object, by using another neural network that is trained based on either one or both of depth information of the sample object and tactile sensing information of the sample object; and generating the control parameter of the tool based on the estimated physical property of the target object, the estimated velocity of the target object, and the predetermined target velocity.

The physical property of the target object may include at least one of shape, texture, material, fragility, strength, and size of the target object.

The tool control method may further include: transmitting, to the tool, the control parameter that enables the tool to gradually increase a distance between two fingers of the tool based on the control parameter, until the estimated velocity becomes the predetermined target velocity.

While the afore described methods, devices, and non-transitory computer-readable mediums have been described individually, these descriptions are not intended to suggest any limitation as to the scope of use or functionality thereof. Indeed these methods, devices, and non-transitory computer-readable mediums may be combined in other aspects of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

Figure 1:
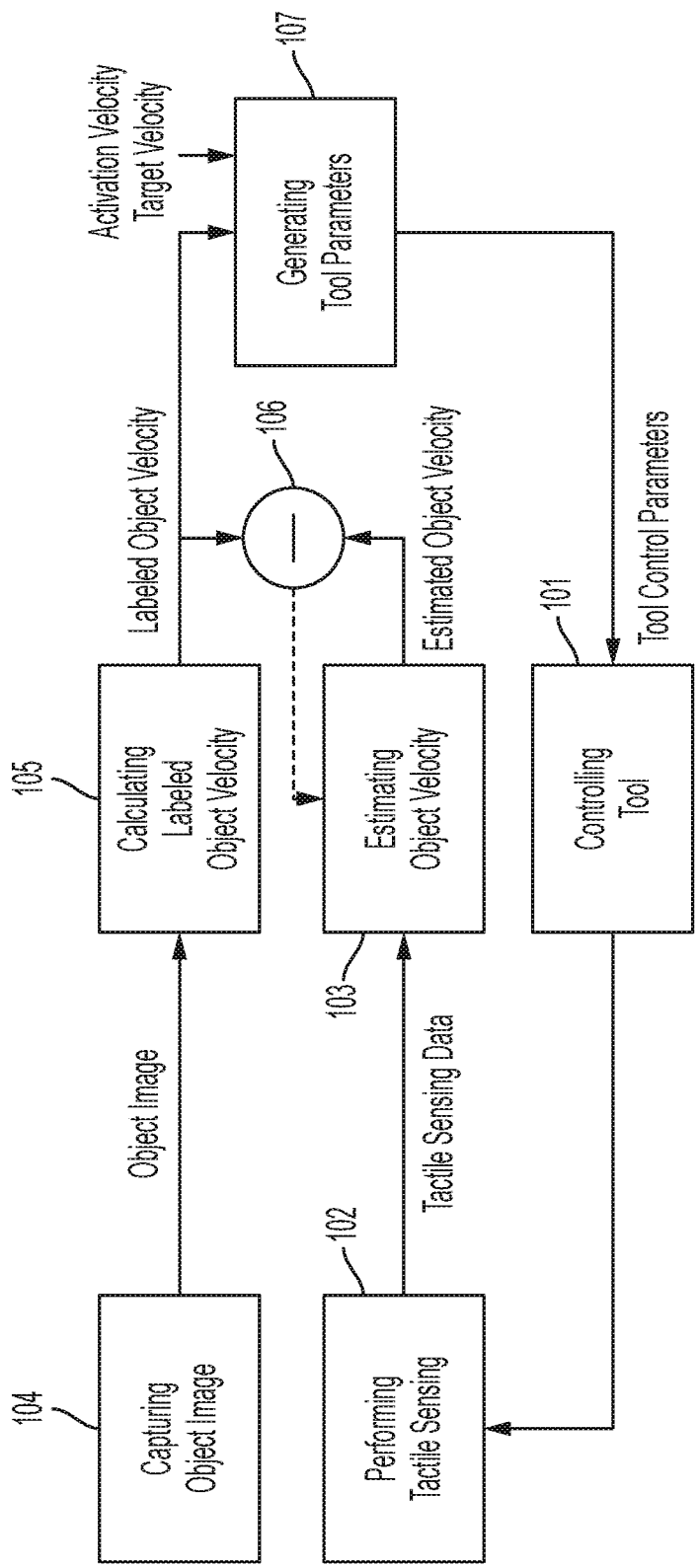
FIG. 1 is a diagram for describing a training method of estimating an object velocity according to embodiments.

Embodiments of the present disclosure provide an artificial intelligence (AI)-based tool controlling apparatus and an operating method thereof.

As the disclosure allows for various changes and numerous examples, the embodiments will be illustrated in the drawings and described in detail in the written description. However, this is not intended to limit the disclosure to modes of practice, and it will be understood that all changes, equivalents, and substitutes that do not depart from the spirit and technical scope of the disclosure are encompassed in the disclosure.

In the description of the embodiments, detailed explanations of related art are omitted when it is deemed that they may unnecessarily obscure the essence of the disclosure. Also, numbers (for example, a first, a second, and the like) used in the description of the specification are identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, each element described hereinafter may additionally perform some or all of functions performed by another element, in addition to main functions of itself, and some of the main functions of each element may be performed entirely by another component.

In the present specification, an 'image' may denote a still image, a moving image including a plurality of consecutive still images (or frames), or a video. The image may be a two-dimensional (2D) image or a three-dimensional (3D) image.

Further, in the present specification, a neural network is a representative example of an artificial intelligence model, but embodiments are not limited to an artificial intelligence model using an algorithm.

Furthermore, in the present specification, a 'parameter' or a 'neural network parameter' is a value used in an operation process of each layer forming a neural network, and for example, may include a weight used when an input value is applied to an operation expression. Here, the parameter may be expressed in a matrix form. The parameter is a value set as a result of training, and may be updated through separate training data when necessary.

Throughout the disclosure, the expression "at least one of a, b or c" indicates only a, only b, only c, both a and b, both a and c, both b and c, all of a, b, and c, or variations thereof.

FIG. 1 is a diagram for describing a training method of estimating an object velocity according to embodiments.

With reference to FIG. 1, a tool control process 101 may be performed to manipulate a tool with regard to an object, based on tool control parameters received from a tool controller. Through the tool control process 100, various object placing tasks, such as loading a fridge, loading a shelf, loading a dishwasher, placing an item on a table, may be carried out. Examples of the tool may include a robot arm end effector, a robot gripper (e.g., a two-finger gripper, a parallel jaw gripper, etc.), a robot tweezer, and the types of the tool are not limited thereto. The tool may have a tactile sensor that is mounted thereon to measure information arising from physical interactions between the tool and the object. Examples of the object may include a cup, a plate, a bottle, a box, a glass, and a plastic container, and the types of the object are not limited thereto. The tool may hold, move, release, and place the object at a predetermined designated location according to the tool control parameters. In a case in which the tool is implemented as a gripper with two handles (or two fingers), the gripper may pick up and hold the object using the two handles, and then gently place the object on a table by adjusting the spacing between the two handles and thereby causing the object to slide down onto the table across the surface of the handles. The tactile sensor may be mounted on the two handles of the gripper, to be contacted by the object when the object is held and slid by the gripper.

A tactile sensing process 102 may be performed to acquire tactile sensing data from the tactile sensor mounted on the tool. The tactile sensor may include any one or any combination of a piezoresistive sensor, a piezoelectric sensor, a capacitive sensor and an elastoresistive sensor to detect impedance, static pressure, dynamic pressure, force, vibration, temperature, and/or heat flow, and also to identify texture, shape, material, strength, and/or fragility of the object. The tactile sensing data may include impedance of an electrode of the tactile sensor, static pressure that may represent force exerted to the tactile sensor by the object, dynamic pressure that may represent vibration that occurs in the tool when the object slides down over the tool, a rate of heat transfer from the tactile sensor to the object, and temperature of the object.

For example, when the gripper is controlled to hold and slide the object downward across the surface of the two handles of the gripper, the tactile sensor may measure the impedance using electrodes mounted on each of the handles, and may also measure the static pressure and the dynamic pressure that are applied to the tactile sensor by the object.

A velocity estimation process 103 may be performed to estimate a velocity of the object, based on the tactile sensing data obtained as a result of the tactile sensing process 102. The object velocity estimation process 103 may be performed by one or more neural networks using artificial intelligence (AI) technology. For example, the one or more neural networks may include a first neural network, a second neural network, and a third neural network configured to accept, as input data, the impedance, the static pressure, and the dynamic pressure, respectively. The one or more neural networks may also include a concatenation layer and fully connected layers to combine data that is output from the first neural network, the second neural network, respectively, and then output an estimated velocity of the object by processing the combined data.

An image capturing process 104 may be performed to capture an image of the object that is held and slid down by the tool, by using a vision sensor, such as for example, a two-dimensional (2D) camera, a three-dimensional (3D) camera, or a motion capture senor system.

A labeled velocity estimation process 105 may be performed to calculate a labeled object velocity (i.e., a ground-truth velocity) of the object, based on the captured image of the object. The labeled velocity estimation process 105 may include performing Kalman filtering or linear quadratic estimation on the captured image of the object, to obtain the labeled object velocity based on a position of the object that is indicated in the captured image.

A comparison process 106 may be performed on the estimated object velocity in comparison with the labeled object velocity to calculate a difference between the estimated object velocity and the labeled object velocity. In the comparison process 106, the difference between the estimated object velocity and the labeled object velocity is calculated as a loss, and information of the loss is provided as feedback to the velocity estimation process 103 to iteratively reduce the loss. The loss may represent the system's performance on inferring the velocity of the object from the tactile sensing data.

A tool control parameter generation process 107 may be performed to generate tool control parameters of the tool, based on a predetermined activation velocity, a predetermined target velocity, and the labeled object velocity that is obtained as a result of performing the labeled velocity estimation process 105. Examples of the tool control parameters may include a position of the tool (e.g., x, y, and z coordinates of the tool), a distance between handles (or fingers) of a robot gripper (or a robot end effector) when the tool is implemented as the robot gripper or the robot end effector, a grip force, and a closing or opening speed of the robot gripper (or the robot end effector).

The tool control parameters are provided from a tool controller to the tool to adjust grip force of the tool and thereby to control a downward sliding velocity of the object. For example, the tool control parameters may indicate a distance between fingers (handles, end effectors, or the like) of the tool, and the finger distance may serve as a surrogate for the grip force. An objective of the tool control parameter generation process 107 is to change the grip force via the finger distance so that the object moves downwards (i.e., in the gravity direction) at a target velocity which is lower than a natural free-fall velocity (i.e., the velocity attained by the object accelerating under gravity) after the object has traveled a distance equal to its length. For example, the target velocity may be set to in a range between −3 cm/s and 0 cm/s.

The tool control parameter generation process 107 may include an initial stage, a pre-sliding stage and a sliding stage.

In the initial stage, an initial finger distance is set and provided to the tool, and the tool holds the object with the initial finger distance in such a way that the object has zero initial velocity and acceleration. While the tool maintains the initial finger distance, the object will not move.

In the pre-sliding stage, the tool gradually opens the fingers until the object starts to move and achieves an downward activation velocity, which is less than the target velocity. The finger distance may be gradually increased until the object velocity becomes the downward activation velocity. For example, the finger distance is changed based on the following equation (1):

$$P_t = P_0 - k_i^{pre\text{-}slide} \Sigma_{j=0}^{t}(\hat{v}_j - v_A) \quad (1)$$

$P_t$ denotes the finger distance at time t, $P_0$ denotes the initial finger distance, $k_i^{pre\text{-}slide}$ denotes a gain of the tool controller, $\hat{v}_j$ denotes the object velocity, and $v_A$ denotes the downward activation velocity. $k_i^{pre\text{-}slide}$ and $v_A$ may have predetermined values, and may be set to, for example, 1.0 and −1.0 cm/s, respectively.

In the pre-sling stage, the tool may be commanded to adjust the finger distance according to equation (1). $P_t$ may be referred to as a commanded finger distance at time t.

The tool controller may terminate the pre-sliding stage and may transition to the sliding stage when the object velocity exceeds a predetermined percentage (e.g., 50%) of the downward activation velocity. When $t_1$ is a pre-sliding termination time, which is a first point in time at which the object velocity exceeds the predetermined percentage (e.g., 50%) of the downward activation velocity $$\left(\text{i.e., } |\hat{v}_t| \geq \left|\frac{v_A}{2}\right|\right),$$

the finger distance at time $t_1$ is expressed as $p_{t1}$.

In the sliding stage, a shift $\Delta p_t$ from the finger distance $p_{t1}$ at the end of the pre-sliding stage may be calculated to regulate the object velocity to the target velocity. For example, in the sliding stage, the tool controller may set the finger distance based on the following equations:

$$e_t = \hat{v}_t - v^* \quad (2)$$

$$\Delta p_t = k_p e_t + k_i \sum_{j=t_1}^{t} e_j + k_d \frac{e_t - e_{t-t_{Lag}}}{t_{Lag} \Delta_t} \quad (3)$$

$$p_t = p^* - \Delta p_t \quad (4)$$

In equation (2), $e_t$ denotes a tracking error, $\hat{v}_t$ denotes the object velocity at time t, and $v^*$ denotes the target velocity. In equation (3), $\Delta p_t$ denotes a difference between the finger distance $p_a$ at the pre-sliding stage termination time $t_1$ and a current finger distance $p^*$. Finite difference approximation of the tracking error, and running discrete sum of the tracking error are used to approximate the integral of the tracking error. $k_p$, $k_i$, and $k_d$ denote predetermined gains of the tool controller, and may be set to, for example, 20, 10, and 1.8, respectively. $t_{Lag}$ denotes a positive integer indicating the number of time steps over which the tool controller calculates the finite difference, and may be set to, for example, 20. $\Delta_t$ denotes an element of a matrix that is used to calculate the labeled object velocity from the captured image of the object. For example, $\Delta_t$ may be set to 0.05 seconds. In equation (4), $p_t$ denotes a target (or desired) finger distance at time t, $p^*$ denotes the current finger distance, and $\Delta p_t$ denotes the shift from the finger distance $p_a$ at the pre-sliding stage termination time $t_1$ to the current finger distance $p^*$. $p_t$ is also referred to as a finger distance command since the tool controller may transmit the value of $p_t$ to the tool, as a tool control parameter, so that the tool sets the finger distance to the value $p_t$ as commanded by the tool controller.

When the tool controller transitions to the sliding stage, the tool may be commanded to change the finger distance according to equations (2)-(4).

The tool control parameters generated in each of the pre-sliding stage and the sliding stage are provided to the tool to adjust the finger distance and thereby to control the velocity of the object. The tactile sensing data are obtained from the tool while the tool and the velocity of the object are controlled in the pre-sliding stage and the sliding stage, respectively. The tool control parameters, the tactile sensing data, the estimated object velocity, and the labeled object velocity may contain time stamps, to synchronize the tool control parameters, the tactile sensing data, the estimated object velocity, and the labeled object velocity each other, and also to identify whether each of the data is obtained in the pre-sliding stage or in the sliding stage. For example, when the pre-sliding stage occurs from time $t_0$ to $t_2$, and the sliding stage occurs from time t3 to $t_T$, each of the tactile sensing data, the labeled object velocities, the tool control parameters, and the estimated object velocities is labeled with time information (e.g., data acquisition time information, as show in the Table below.

| | |
|---|---|
| Tactile Sensing Data 1 (e.g., impedance) | $a_0, a_1, a_2, a_3, \ldots a_{Ti}$ |
| Tactile Sensing Data 2 (e.g., static pressure) | $b_0, b_1, b_2, b_3, \ldots b_{Ti}$ |
| Tactile Sensing Data 3 (e.g., dynamic pressure) | $c_0, c_1, c_2, c_3, \ldots c_{Ti}$ |
| Labeled Object Velocities | $\hat{v}_0, \hat{v}_1, \hat{v}_2, \hat{v}_3 \ldots \hat{v}_{Ti}$ |
| Tool Control Parameters (e.g., finger distance commands) | $p_0, p_1, p_2, p_3, \ldots p_{Ti}$ |
| Estimated Object Velocities | $\widetilde{v_0}, \widetilde{v_1}, \widetilde{v_2}, \widetilde{v_3}, \ldots \widetilde{v_{Ti}}$, |

Figure 2:
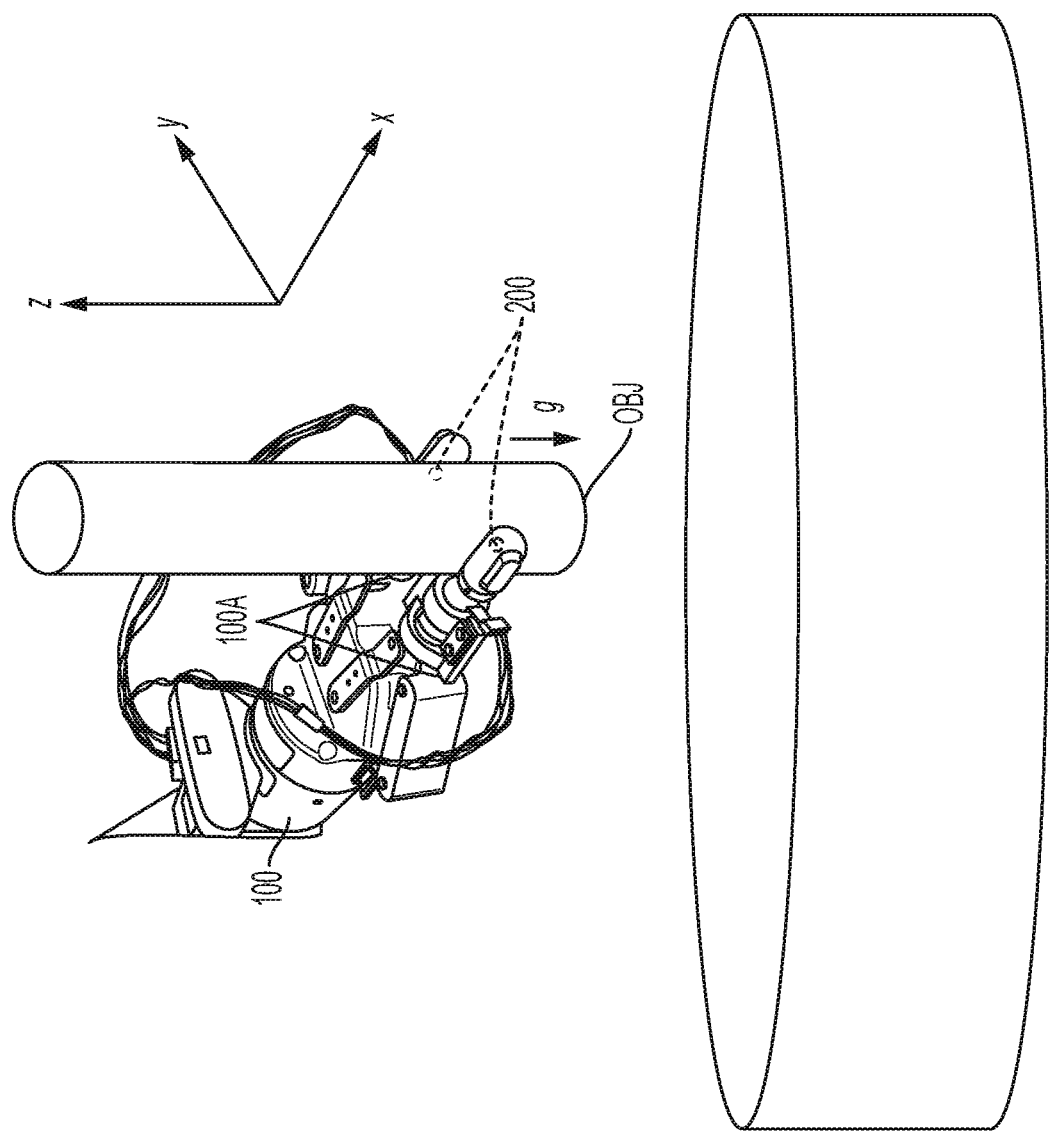
FIG. 2 is a diagram for illustrating a system for manipulating a tool according to embodiments.

FIG. 2 is a diagram for illustrating a system for manipulating a tool according to embodiments.

With reference to FIG. 2, a tool 100 may carry out various object placing tasks, such as loading a fridge, loading a shelf, loading a dishwasher, placing an object OBJ on a table, and the like, by controlling the position of the tool 100 and the spacing between fingers (or handles) 110A of the tool 100.

The tool 100 may be implemented as a robot arm end effector, a robot gripper (e.g., a two-finger robot gripper, a three-finger robot gripper, or a parallel jaw gripper), or a robot tweezer, and the types of the tool are not limited thereto.

According to tool control parameters, the tool 100 may hold the object OBJ and then gradually open the fingers 110A of the tool 100 to slide the object OBJ down in the gravity direction (i.e., "g" direction) and to gently place the object OBJ on the table. Examples of the object OBJ may include a cup, a glass, a plate, a bottle, a box, a plastic container, and the types of the object OBJ are not limited thereto.

A tactile sensor 200 may be mounted on an inner surface of each of the fingers 110A to be contacted by the object OBJ and to obtain tactile sensing data, when the object OBJ is held by the tool 100 and slid down across the inner surfaces of the fingers 110A.

Figure 3:
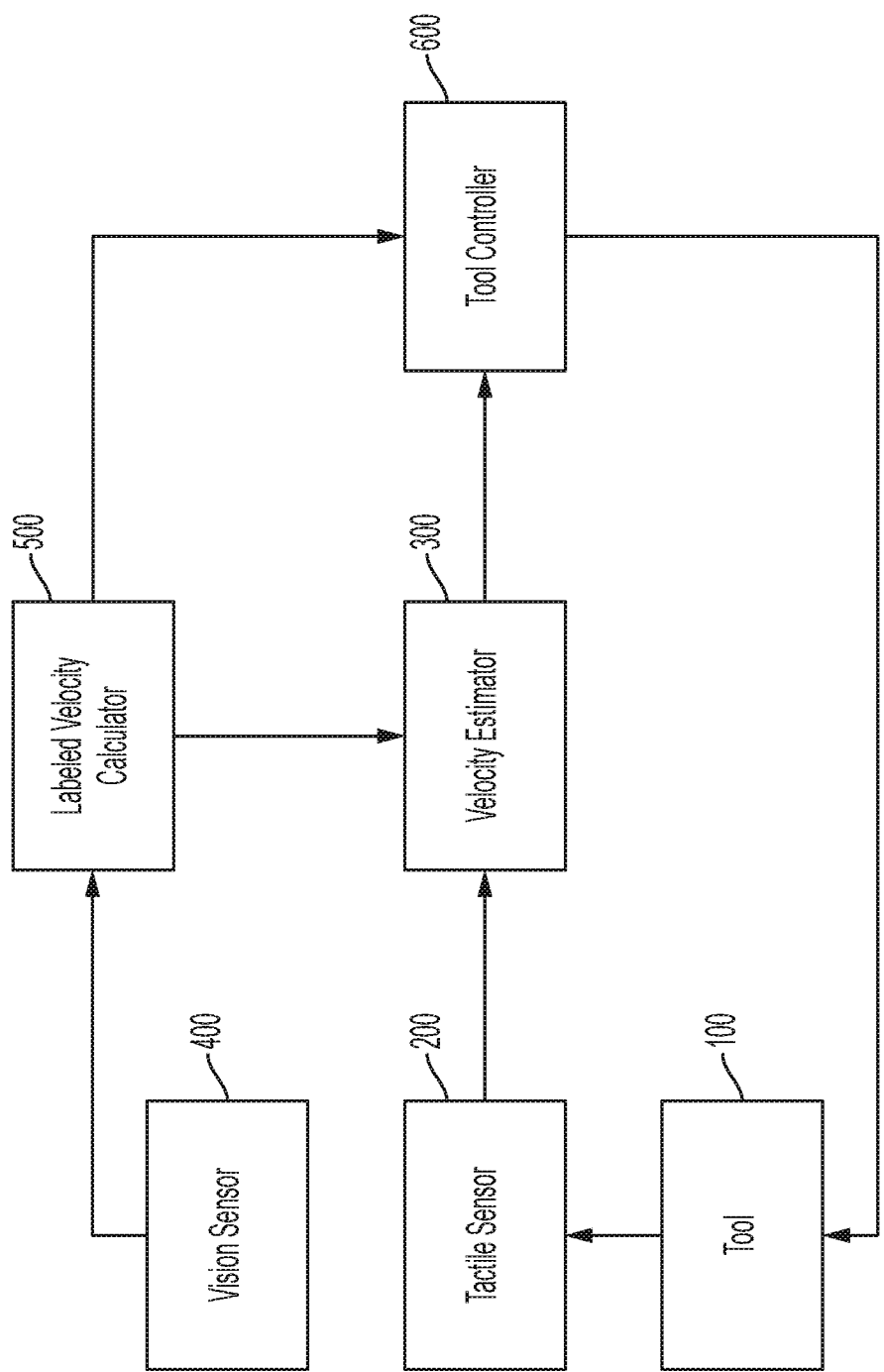
FIG. 3 is a diagram illustrating an object velocity estimation system and a training process of the object velocity estimation system according to embodiments.

FIG. 3 is a block diagram illustrating an object velocity estimation system and a training process of the object velocity estimation system according to embodiments.

As shown in FIG. 3, the velocity estimating system according to embodiments may include a tool 100, a tactile sensor 200, a velocity estimator 300, a vision sensor 400, a labeled velocity calculator 500, and a tool controller 600.

The tool 100 may be configured to hold, pick up, move, drop, slide, and/or place an object. When the tool 100 is implemented as a robot end effector with two fingers, the gripper may pick up and hold an object using the two hands, and then gently place the object at a designated location by adjusting the spacing between the two hands and thereby causing the object to slide down to the designated location.

The tactile sensor 200 may be mounted on the tool 100 to be contacted by the object when the object is held and slid down by the tool 100. The tactile sensor 200 may perform the tactile sensing process 102 to acquire tactile sensing data from the tool 100. The tactile sensor 200 may obtain tactile sensing data of impedance, static pressure, dynamic pressure, force, vibration, temperature, and/or heat flow from the tool 100, and may identify texture, shape, material, strength, or fragility of the object based on the tactile sensing data. A configuration of the tactile sensor 200 will be described in further detail with reference to FIG. 4 below.

The velocity estimator 300 may perform the velocity estimation process 103 and the comparison process 106. The velocity estimator 300 may receive the tactile sensing data from the tactile sensor 200, and may receive a labeled object velocity from the vision sensor 400 through the labeled velocity calculator 500. In the forward pass, the velocity estimator 300 may use one or more neural networks to estimate the velocity of the object that is moved by the tool 100, based on the tactile sensing data and the labeled object velocity. The velocity estimator 300 may calculate a difference between the estimated object velocity and the labeled object velocity as a loss. In the backpropagation pass, the velocity estimator may back propagate the loss to the one or more networks to iteratively reduce the loss. The loss may represent the system's performance on inferring the object velocity from the tactile sensing data. A configuration of the velocity estimator 300 will be described in further detail with reference to FIGS. 5 and 6 below.

The vision sensor 400 may perform the image capturing process 104 to capture an image of the object that is held and slid down by the tool 100. The vision sensor 400 may be implemented as a two-dimensional (2D) camera, a three-dimensional (3D) camera, or a motion capture senor system.

The labeled velocity calculator 500 may perform the labeled velocity estimation process 105 to calculate a labeled object velocity (i.e., a ground-truth velocity) of the object, based on the image of the object captured when the object that is held and slid down by the tool 100. The labeled velocity calculator 500 may include a Kalman filter to perform Kalman filtering or linear quadratic estimation on the captured image of the object, and to obtain the labeled object velocity from the captured image showing the position of the object (e.g., the position of the object in the z-direction as shown in FIG. 2).

The tool controller 600 may perform the tool parameter generation process 107 to generate tool control parameters based on a predetermined activation velocity, a predetermined target velocity, and the labeled object velocity that is obtained from the labeled velocity calculator 500. Examples of the tool control parameters may include a position of the tool 100 (e.g., x, y, and z coordinates of the tool), a distance between handles (or fingers) of a robot gripper (or a robot end effector) when the tool 100 is implemented as the robot gripper or the robot end effector, a grip force, and a closing or opening speed of the robot gripper (or the robot end effector).

The tool controller 600 may generate the tool control parameters in a pre-sliding stage and a sliding stage. In the pre-sliding stage, the tool controller 600 may generate the tool control parameters based on equation (1), and may transition to the sliding stage when which the object velocity reaches a predetermined pre-sliding termination velocity which is lower than a target velocity in the sliding stage. In the sliding stage, the tool controller 600 may generate the tool control parameters based on equations (2)-(4).

The tool controller 600 may generate the tool control parameters in each of the pre-sliding stage and the sliding stage, separately, and may provide the tool control parameters to the tool 100 to control the finger distance of the tool 100 and the velocity of the object. The tactile sensing data are obtained from the tool 100 while the tool 100 and the velocity of the object are controlled in the pre-sliding stage and the sliding stage, respectively. The tool control parameters, the tactile sensing data, the estimated object velocity, and the labeled object velocity may contain time stamps, to synchronize the tool control parameters, the tactile sensing data, the estimated object velocity, and the labeled object velocity each other, and also to identify whether each of the data is obtained in the pre-sliding stage or in the sliding stage. A configuration of the tool controller 600 will be described in further detail with reference to FIG. 7 below.

The velocity estimator 300, the labeled velocity calculator 500, and the tool controller 600 may be trained in one processor, or one computer system including a plurality of processors and one or more storages.

Figure 4:
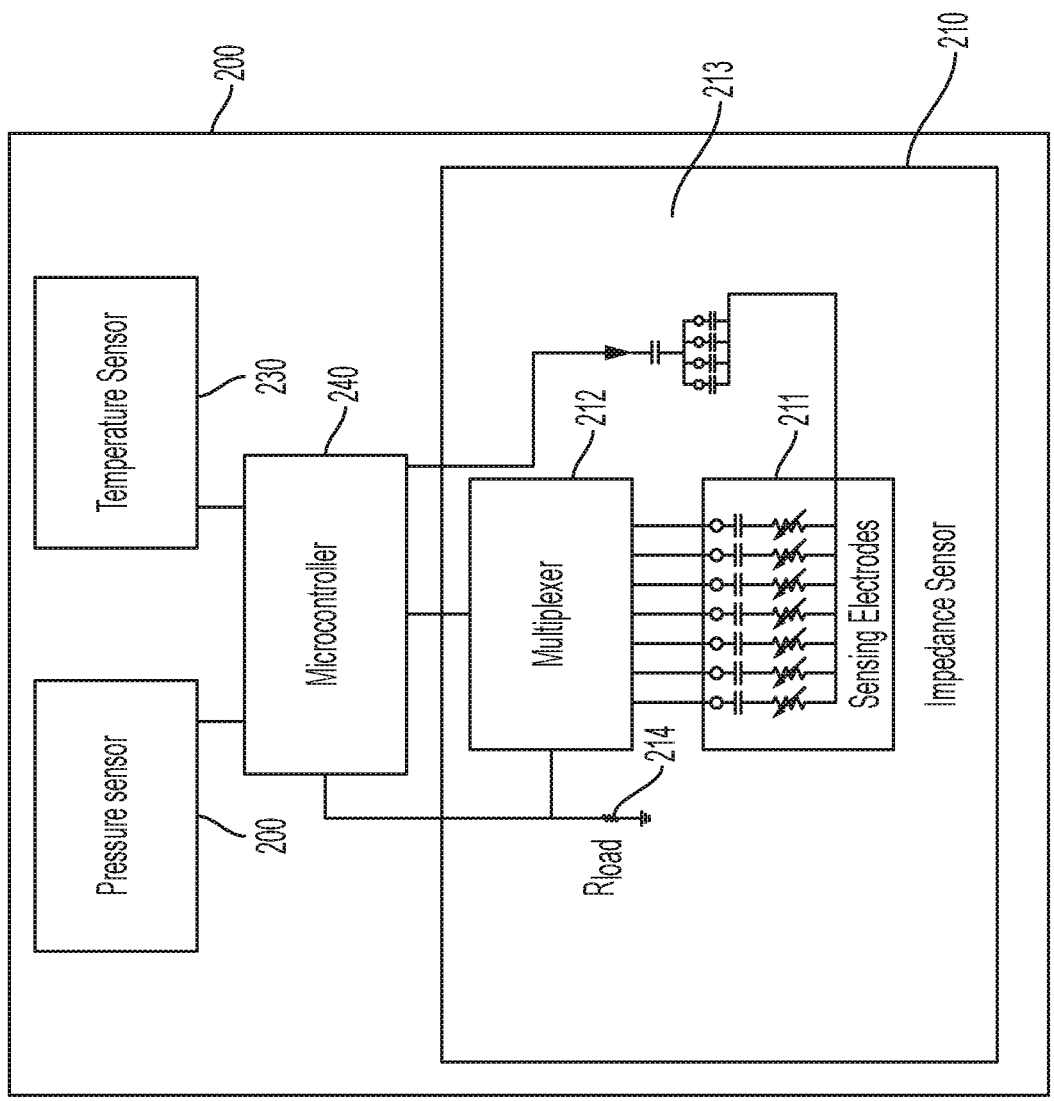
FIG. 4 is a diagram for describing a tactile sensor according to embodiments.

FIG. 4 is a diagram for describing a tactile sensor according to embodiments.

As shown in FIG. 4, the tactile sensor 200 may include an impedance sensor 210, a pressure sensor 220, a temperature sensor 230, and a microcontroller 240 to obtain information arising from physical interactions between the tool 100 and an object. The tactile sensor 200 may be mounted on each of the fingers 110A of the tool 100 as shown in FIG. 2.

The impedance sensor 210 may include a plurality of sensing electrodes 211, a multiplexer 212 that is connected to the plurality of sensing electrodes 211, a plurality of excitation electrodes 213 that are connected between the microcontroller 240 and the plurality of sensing electrodes 211, and a load resistor 214 disposed between the microcontroller 240 and the multiplexer 212. The microcontroller 240 may be considered as part of the impedance sensor 210 while the microcontroller 240 is illustrated separately from the impedance sensor 210.

Each of the plurality of sensing electrodes 211 may have a portion exposed outside to be contacted by the object. The multiplexer 212 may selectively connect one or more of the plurality of sensing electrodes 211 to the plurality of excitation electrodes 213. The impedance sensor 210 may measure a voltage divided between a selected one of the plurality of sensing electrodes 211 and the plurality of excitation electrodes 213 (e.g., a first voltage divided between a first sensing electrode 211 and four excitation electrodes 213, a second voltage divided between a second sensing electrode 211 and the four excitation electrodes 213, and a third voltage divided between a third sensing electrode 211 and the four excitation electrodes 213), with reference to the load resistor 214. The microcontroller 240 may determine an impedance of each of the plurality of sensing electrodes 211 based on the measured voltage. The impedance of the plurality of sensing electrodes 211 may increase as the measured voltage decreases.

The pressure sensor 220 may measure pressure exerted to the tool 100 by the target object. The pressure sensor 220 may be implemented as a piezo-resistive pressure transducer and may measure, as raw data, fluid pressure which indicates pressure applied to fluid contained in the tactile sensor 200. The pressure sensor 220 may apply a low pass filter to the fluid pressure to obtain a static pressure, and may apply a band-pass filter to the fluid pressure to obtain a dynamic pressure. The static pressure may represent a baseline pressure value, and may be also referred to as force. The dynamic pressure may represent an amount of vibrations that occurs in the tool 100 when the object slides downward across the contact surface of the tool 100. As the object slides across the contact surface of the tactile sensor 200, the object generates vibrations that are detected as the dynamic pressure by the pressure sensor 220.

The temperature sensor 230 may measure an absolute temperature and a dynamic temperature, for example, by using a thermistor voltage divider, a resistor, and a power supply. When the object comes into contact with the tactile sensor 200, heat that flows from the tactile sensor 200 into the object produces thermal gradients, and the temperature sensor 230 may detect the thermal gradient as a change in the temperature of the tactile sensor 200.

Figure 5:
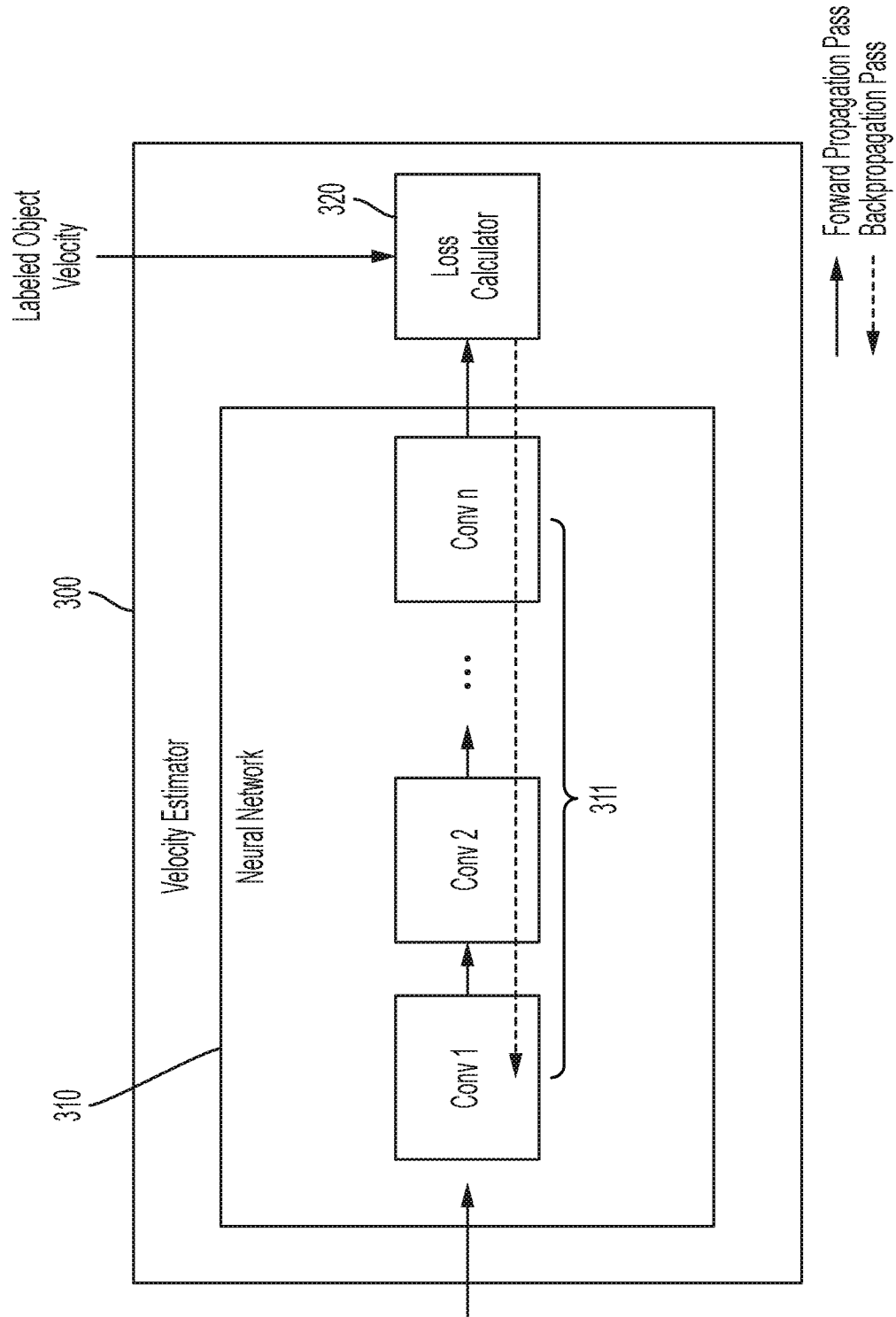
FIG. 5 is a diagram for describing a velocity estimator and a training process of the velocity estimator according to embodiment.

FIG. 5 is a diagram for describing a velocity estimator and a training process of the velocity estimator according to embodiments.

As shown in FIG. 5, the velocity estimator 300 may include a neural network 310 and a loss calculator 320, and the neural network 310 may include a plurality of convolutional layers 311.

The neural network 310 may accept, as input data, impedance values of the plurality of electrodes 211 detected by the impedance sensor 210 of the tactile sensor 200, and a static pressure value and a dynamic pressure value detected by the pressure sensor 220 of the tactile sensor 200. In the forward pass, the neural network 310 may process the impedance values, the static pressure value, and the dynamic pressure value through the plurality of convolutional layers 311, and may output, as a processing result of the impedance values, the static pressure value, and the dynamic pressure, an estimated velocity value of the object. The neural network 310 may output the estimated velocity value to the loss calculator 320.

The loss calculator 320 may receive the estimated velocity value and a labeled object velocity, and may calculate a difference between the estimated velocity value and the labeled object velocity as loss. The loss may represent the system's performance on inferring the velocity of the object from the tactile sensing data, and may be also referred to as error metrics of the neural network 310.

The loss may be back propagated to the neural network 310 to train the neural network 310 and thereby to minimize the loss. The neural network 310 is trained iteratively using optimization techniques like gradient descent. At each cycle of training, the loss (i.e., error metrics) is calculated based on the difference between the estimated objective velocity and the labeled object velocity. The derivative of the loss may be calculated and propagated back to the neural network 310 using a technique called backpropagation. The neural network 310 is trained in a manner in which each neuron's coefficients/weights of the neural network 310 are adjusted relative to how much the neurons contributed to the loss in the previous training cycle. The process is repeated iteratively until the loss drops below a predetermined threshold. When the loss is below the predetermined threshold, the velocity estimator 300 may determine that the loss is minimized. The minimization of the loss may lead to improvement in accuracy of the estimated object velocity.

Figure 6:
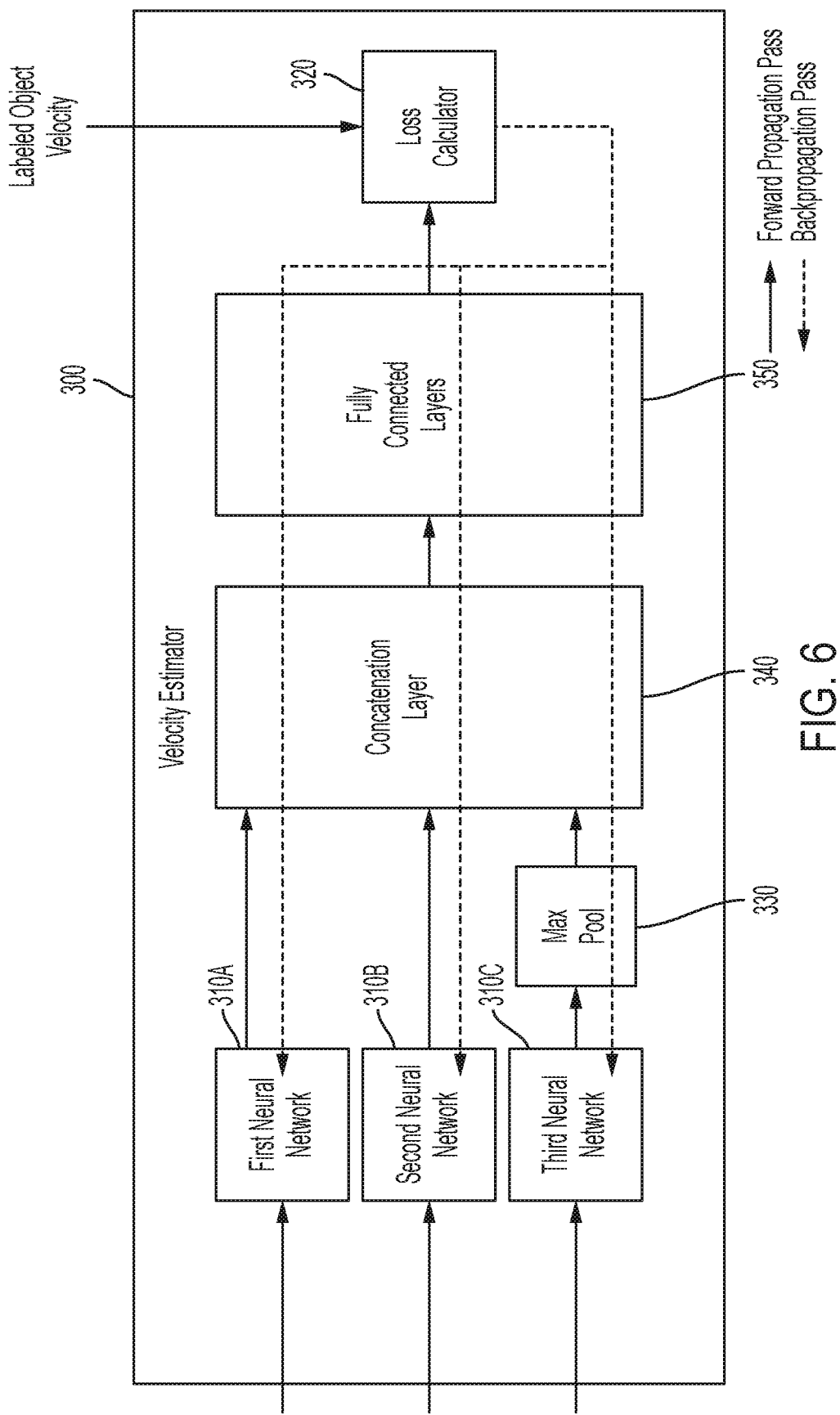
FIG. 6 is a diagram for describing a velocity estimator and a training process of the velocity estimator according to other embodiments.

FIG. 6 a diagram for describing a velocity estimator and a training process of the velocity estimator according to other embodiments.

As shown in FIG. 6, the velocity estimator 300 may include a first neural network 310A, a second neural network 310B, and a third neural network 310C, and a loss calculator 320 that calculates loss based on comparison between a velocity of an object estimated by the first, second, and third neural networks 310A, 310B, and 310C, and a labeled object velocity (e.g., a ground-truth velocity) calculated from a captured image of the object. Each of the first, second, and third neural networks 310A, 310B, and 310C may include a plurality of convolutional layers 311. The velocity estimator 300 may further include a concatenation layer 340 and fully connected layers 350 provided between the first, second, and third neural networks 310A, 310B, and 310C, and the loss calculator 320. A max pooling layer 330 may be provided between the third neural network 310C and the concatenation layer 340, when a sampling rate of the input data of the third neural network 310C is higher than sample rates of the input data of the first and second neural networks 310A and 310B. The max pooling layer 330 may be omitted when the sampling rates of the input data of the first, second, and third neural networks 310A, 310B, and 310B are substantially the same as each other.

The first neural network 310A, the second neural network 310B, and the third neural network 310C may accept, as input data, impedance values of the plurality of electrodes 211 detected by the impedance sensor 210 of the tactile sensor 200, and a static pressure value and a dynamic pressure value detected by the tactile sensor 200, respectively. The first neural network 310A, the second neural network 310B, and the third neural network 310C may be also referred to as an impedance processing neural network, a static pressure processing neural network, and a dynamic pressure processing neural network, respectively.

The first neural network 310A, the second neural network 310B, and the third neural network 310C may process the impedance values, the static pressure value, and the dynamic pressure value through the plurality of convolutional layers 311, respectively.

The first neural network 310A and the second neural network 310B may output a first processing result of the impedance values and a second processing result of the static pressure value to the concatenation layer 340.

The third neural network 310C may output a third processing result of the dynamic pressure value to the max pooling layer 330 that is provided between the third neural network 310C and the concatenation layer 340. The max pooling layer 330 may down-sample the third processing result of the dynamic pressure value by applying a max pooling filter to the third processing result of the dynamic pressure value.

The concatenation layer 340 may combine the first processing result of the impedance values, the second processing result of the static pressure value, and the down-sampled third processing result of the dynamic pressure, and may transmit a combination of the first processing result, the second processing result, and the down-sampled third processing result to the fully connected layers 350.

The fully connected layers 350 may estimate the object velocity based on the combination of the first processing result, the second processing result, and the down-sampled third processing result, and output the estimated object velocity to the loss calculator 320.

The loss calculator 320 may receive the estimated velocity value and a labeled object velocity, and may calculate a difference between the estimated velocity value and the labeled object velocity as loss.

The loss may be back propagated to each of the first neural network 310A, the second neural network 310B, and the third neural network 310C, through the fully connected layers 350, the concatenation layer 340, and the max pooling layer 330, to train the first neural network 310A, the second neural network 310B, and the third neural network 310C and thereby to minimize the loss. The first neural network 310A, the second neural network 310B, and the third neural network 310C are trained iteratively using optimization techniques like gradient descent. At each cycle of training, the loss (i.e., error metrics) is calculated based on the difference between the estimated objective velocity and the labeled object velocity. The derivative of the loss may be calculated and propagated back to the first neural network 310A, the second neural network 310B, and the third neural network 310C using a technique called backpropagation. The first neural network 310A, the second neural network 310B, and the third neural network 310C are trained in a manner in which each neuron's coefficients/weights of the first neural network 310A, the second neural network 310B, and the third neural network 310C are adjusted relative to how much the neurons contributed to the loss in the previous training cycle. The process is repeated iteratively until the loss drops below a predetermined threshold. When the loss is below the predetermined threshold, the velocity estimator 300 may determine that the loss is minimized. The minimization of the loss may lead to improvement in accuracy of the estimated object velocity.

Figure 7:
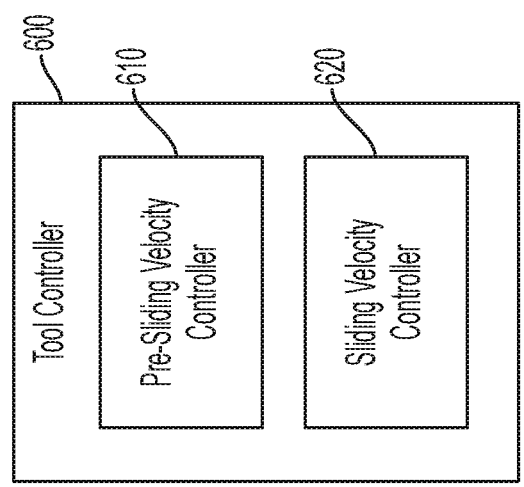
FIG. 7 illustrates a tool controller according to embodiments.

FIG. 7 illustrates a tool controller according to embodiments.

As shown in FIG. 7, the tool controller 600 may include a pre-sliding velocity controller 610 and a sliding velocity controller 620.

The pre-sliding velocity controller 610 may control a distance between fingers of a tool 100 in a pre-sliding stage. In the beginning of the pre-sliding stage, the pre-sliding velocity controller 610 may set an initial finger distance of the tool 100 in such a way that an object held by the tool 100 has zero initial velocity and acceleration. The pre-sliding velocity controller 610 may control the finger distance of the tool 100 according to equation (1) to gradually open the fingers of the tool 10 until the object starts to move and achieves an downward activation velocity. The pre-sliding velocity controller 610 may terminate the pre-sliding stage and may transmit a sliding stage activation signal to the sliding velocity controller 620 when a velocity of the object exceeds a predetermined percentage of the downward activation velocity (e.g., one half of the downward activation velocity).

Upon receiving the sliding stage activation signal, the sliding velocity controller 620 may start to control the finger distance of the tool 100 based on a difference between the current finger distance and the finger distance at the termination time of the pre-sliding stage, and also based on a difference between a predetermined target object velocity and a labeled/estimated object velocity (e.g., a labeled object velocity in a training phase, and an estimated object velocity in a post-training inference phase). For example, the sliding velocity controller 620 may regulate the finger distance of the tool 100 according to equations (2)-(4).

Figure 8:
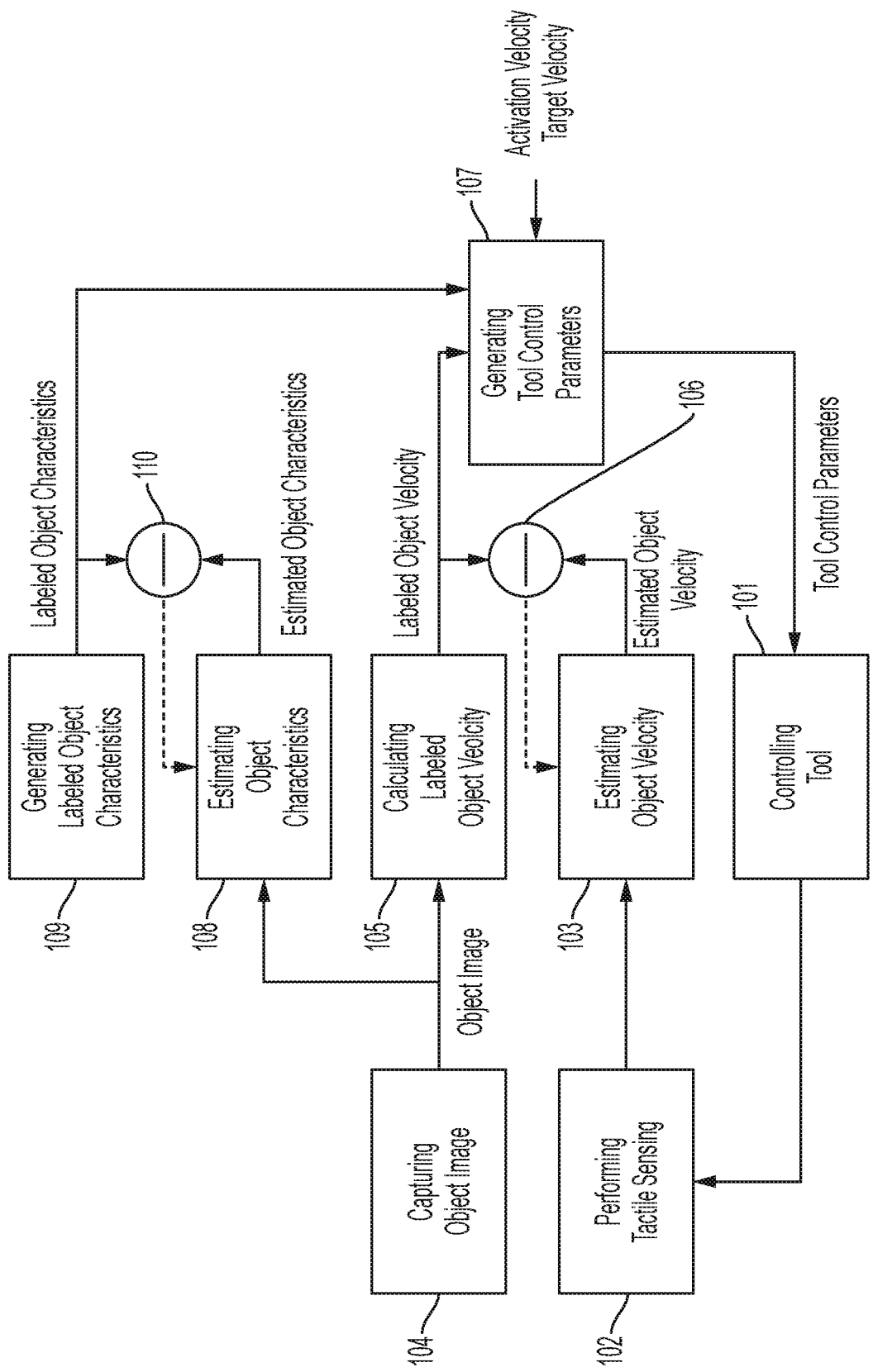
FIG. 8 illustrates a diagram for describing a training method of estimating an object velocity according to other embodiments.

FIG. 8 illustrates a diagram for describing a training method of estimating an object velocity according to other embodiments.

The training method of estimating an object velocity as shown in FIG. 8 may include an object characteristics estimation process 108, a labeled object characteristics generation process 109, and a second comparison process 110, in addition to the tool control process 101, the tactile sensing process 102, the velocity estimation process 103, the image capturing process 104, the labeled velocity estimation process 105, the (first) comparison process 106, and the tool control parameter generation process 107, which are described above with reference to FIG. 1.

The object characteristics estimation process 108 may include receiving, as input data, the object image that is captured in the image capturing process 104, performing image processing on the captured object image, and estimating object characteristics as a result of the image processing. Examples of the object characteristics may include shape, material, fragility, strength, texture, and size of the object, and the object characteristics are not limited thereto. The 'object characteristics' may be also referred to as physical properties of the object.

The labeled object characteristic generation process 109 may include receiving, as input data, at least one of depth information (e.g., a 3D depth image) of the object, a user input indicating object characteristics (e.g., a user's voice input indicating that the object is fragile), and the tactile sensing data that is obtained in the tactile sensing process 102. The labeled object characteristic generation process 109 may be performed to identify object characteristics based on at least one of the depth information, the tactile sensing data, and the user input. The object characteristics identified based on either one or both of the depth image and the tactile sensing data may be used as labeled object characteristics.

The second comparison process 110 may include comparing the estimated object characteristics that are obtained in the object characteristics estimation process 108, with the labeled object characteristics that are obtained in the labeled object characteristics generation process 109, and calculating a difference between the estimated object characteristics and the labeled object characteristics as second loss. The second loss is provided to the object characteristics estimation process 108 as feedback so that the object characteristics estimation process 108 is repeated until the second loss is reduced down to a predetermined threshold.

Figure 9:
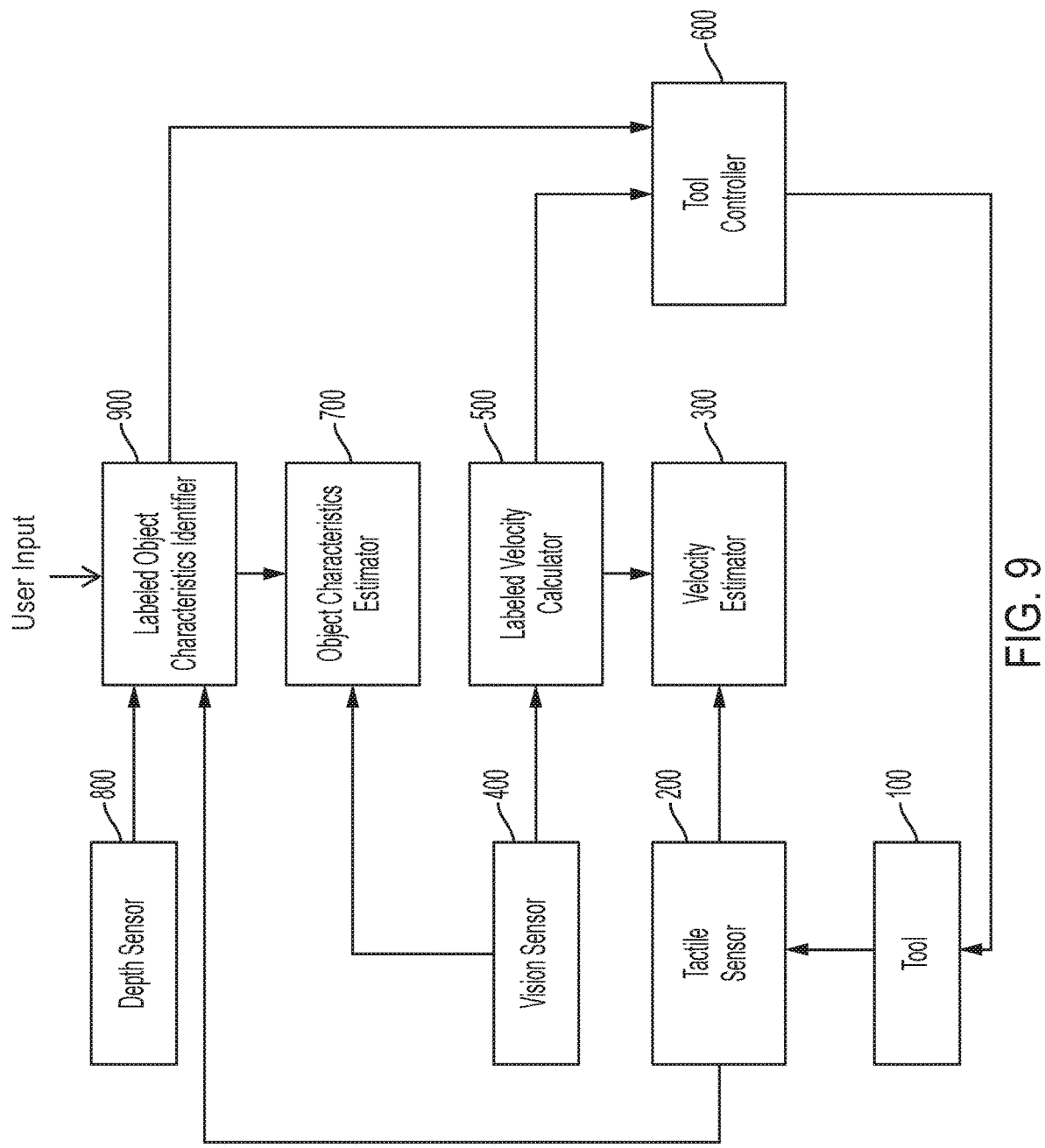
FIG. 9 illustrates a diagram illustrating an object velocity estimation system and a training process of the object velocity estimation system according to embodiments.

FIG. 9 illustrates a diagram illustrating an object velocity estimation system and a training process of the object velocity estimation system according to other embodiments.

The object velocity estimation system as shown in FIG. 9 may include an object characteristics estimator 700, a depth sensor 800, and a labeled object characteristics identifier 900, in addition to the tool 100, the tactile sensor 200, the velocity estimator 300, the vision sensor 400, the labeled velocity calculator 500, and the tool controller 600 which are described above with reference to FIG. 3.

The object characteristics estimator 700 may receive the image of the object from the vision sensor 400, and may estimate characteristics of the object, such as shape, material, fragility, strength, texture, and size of the object, by performing image processing on the captured image. A configuration and an operation of object characteristics estimator 700 will be described in further detail with reference to FIG. 10 below.

The depth sensor 800 may provide a three-dimensional depth image of the object to the labeled object characteristics identifier 900. The object image captured by the vision sensor 400 may be a two-dimensional image, or a three-dimensional image that has a lower resolution or less depth information than the three-dimensional depth image captured by the depth sensor 800.

The labeled object characteristics identifier 900 may receive the three-dimensional depth image from the depth sensor 800, may receive the tactile sensing data from the tactile sensor 200, and/or may receive a user input (e.g., a voice input, a touch input, etc.) indicating characteristics of the object. The tactile sensing data may include impedance, static pressure, dynamic pressure, force, vibration, temperature, and/or heat flow detected from the tool 100. The labeled object characteristics identifier 900 may generate labeled object characteristics based on at least one of the three-dimensional depth image, the tactile sensing data, and the user input indicating characteristics of the object. The labeled object characteristics identifier 900 may provide the labeled object characteristics to the tool controller 600, so that the tool controller 600 controls the tool 100 based on the labeled object characteristics as well as the labeled object velocity in a training phase.

Figure 10:
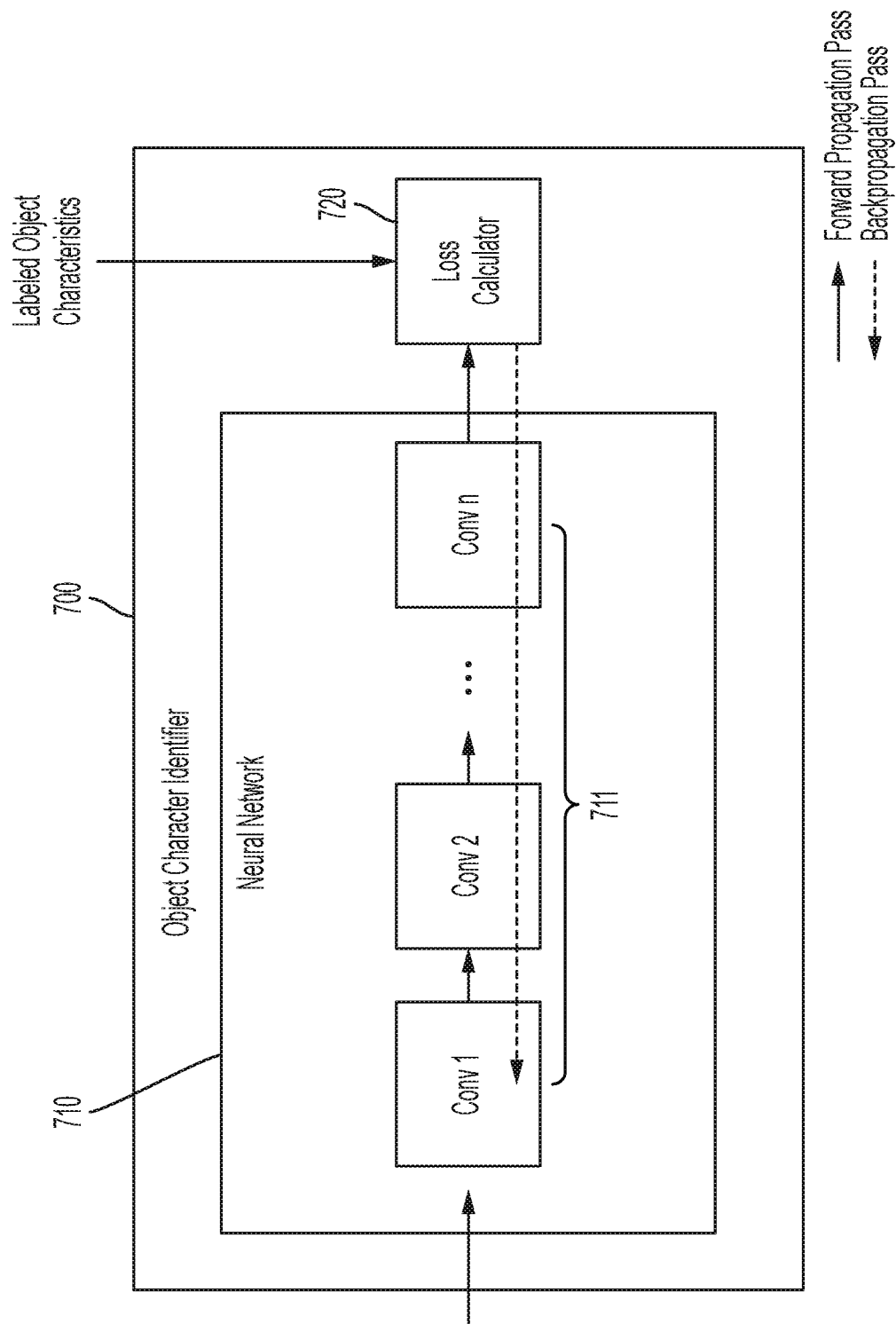
FIG. 10 illustrates an object characteristic identifier and a training process of the object characteristic identifier according to embodiments.

FIG. 10 illustrates an object characteristic identifier and a training process of the object characteristic identifier according to embodiments.

As shown in FIG. 10, the object characteristic identifier 700 may include at least one neural network 710 and a loss calculator 720. The at least one neural network 710 may include a plurality of convolutional layers 711.

The neural network 710 may accept, as input data, the image of the object captured by the vision sensor 400. In the forward pass, the neural network 710 may process the image of the object through the plurality of convolutional layers 711, and may output an estimated object characteristic of the object, as a processing result of the captured object image. The neural network 710 may output the estimated object characteristic to the loss calculator 720.

The loss calculator 720 may receive the estimated object characteristic and a labeled object characteristic, and may calculate a difference between the estimated object characteristic and the labeled object characteristic as loss. The loss may represent the system's performance on inferring the object characteristic from the captured object image, and may be also referred to as error metrics of the neural network 710.

The loss may be back propagated to the neural network 710 to train the neural network 710 and thereby to minimize the loss. The neural network 710 is trained iteratively using optimization techniques like gradient descent. At each cycle of training, the loss (i.e., error metrics) is calculated based on the difference between the estimated objective characteristic and the labeled object characteristic. The derivative of the loss may be calculated and propagated back to the neural network 710. The neural network 710 is trained in a manner in which each neuron's coefficients/weights of the neural network 710 are adjusted relative to how much the neurons contributed to the loss in the previous training cycle. The process is repeated iteratively until the loss drops below a predetermined threshold. When the loss is below the predetermined threshold, the object characteristics identifier 700 may determine that the loss is minimized. The minimization of the loss may lead to improvement in accuracy of the estimated object characteristic.

Figure 11:
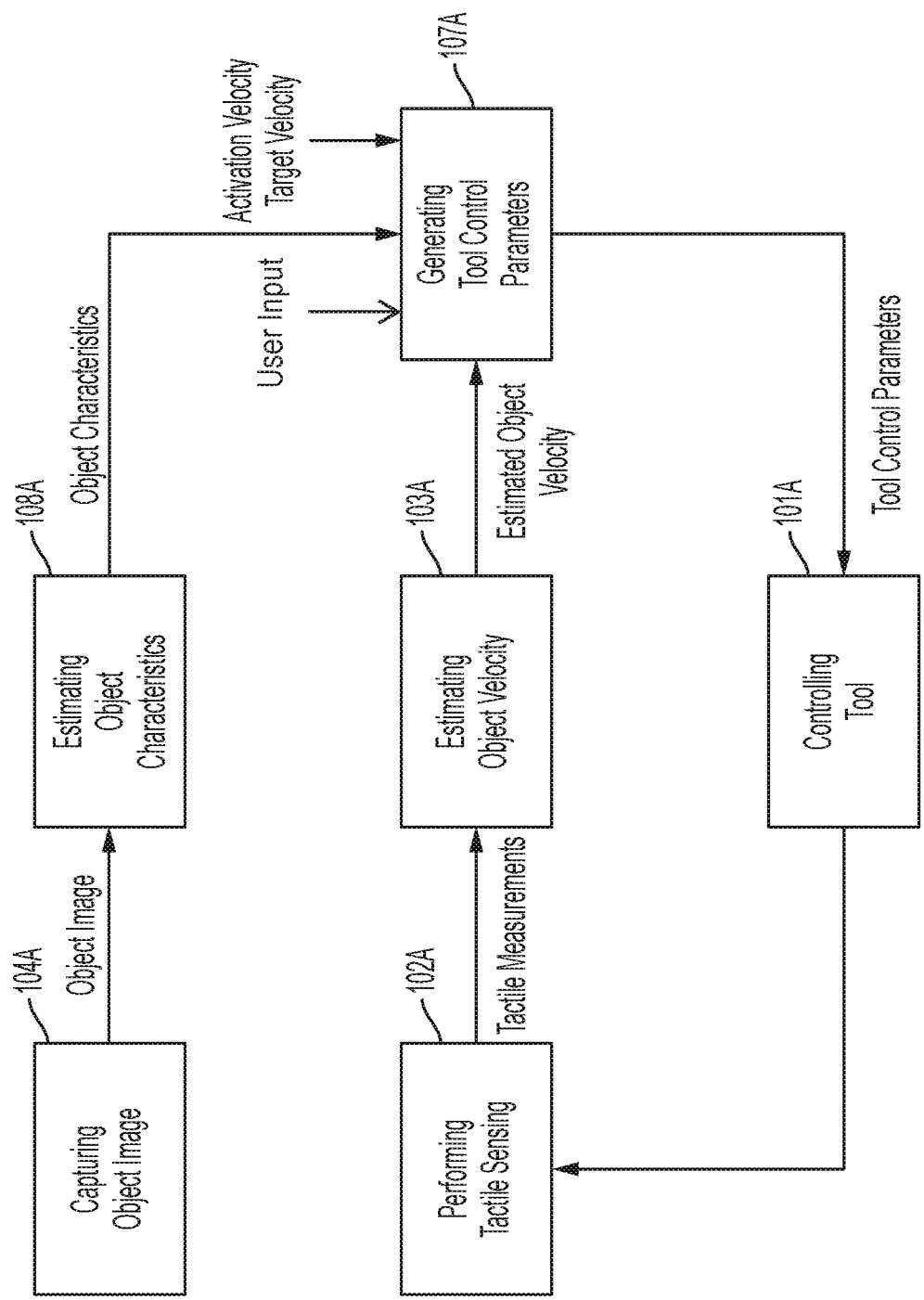
FIG. 11 illustrates a diagram for describing a trained tool control process according to embodiments.

FIG. 11 illustrates a diagram for describing a trained tool control process according to embodiments.

As shown in FIG. 11, a tool control process 101A may be performed to set a finger distance between two or more fingers of a tool 100 based on a finger distance command generated in a pre-sliding stage. In the pre-sliding stage, a tactile sensing process 102A may be performed by using a tactile sensor, to obtain tactile sensing data from the tool 100 while a target object is held by the fingers and slid downward over the surface of the fingers. The tactile sensing data may include impedance of an electrode of the tactile sensor, static pressure that may represent a force exerted to the tactile sensor by the object, dynamic pressure that may represent vibration that occurs in the tool when the object slides down over the tool, a rate of heat transfer from the tactile sensor to the object, and temperature of the object.

An object velocity estimation process 103A may be performed to estimate an object velocity of the target object that is slid downward in the pre-sliding stage. The object velocity estimation process 103A may be performed by one or more neural networks using artificial intelligence (AI) technology. For example, the one or more neural networks may include a first neural network, a second neural network, and a third neural network configured to accept, as input data, the impedance, the static pressure, and the dynamic pressure, respectively. The one or more networks may also include a concatenation layer and fully connected layers to combine data that is output from the first neural network, the second neural network, respectively, and then output an estimated velocity of the object by processing the combined data.

In the meantime, an image capturing process 104A may be performed to capture an image of the target object while the tool control process 101A is performed in the pre-sliding stage, and an object characteristics estimation process 108A may be performed to estimate characteristics of the target object. A tool control parameter generation process 107A may be performed to generate tool control parameters, including a finger distance of the tool 100, based on the estimated object velocity and the estimated object characteristics, in the pre-sliding stage, until the estimated object velocity reaches the activation velocity or a predetermined percentage of the activation velocity (e.g., one half of the activation velocity). In an embodiment, information of object characteristics provided through a user's input (e.g., a voice input, a touch input, etc.) may be also used in setting the finger distance of the tool 100. In the pre-sliding stage, the tool control parameter generation process 107A may generate a finger distance command including a value of the finger distance set according to equation (1), based on the activation velocity and the estimated velocity.

The tool control parameter generation process 107A may transition to a sliding stage when the estimated object velocity reaches the activation velocity or the predetermined percentage of the activation velocity. In the sliding stage, the tool control parameter generation process 107A may be performed to generate the finger distance command including the value of the finger distance set according to equations (2)-(4), based on the target velocity and the estimated velocity. The tool control process 101A, the tactile sensing process 102A, the objective velocity estimation process 103A, the image capturing process 104A, the object characteristics estimation process 108A may be repeatedly performed to generate tool control parameters in the sliding stage until the estimated object velocity becomes the target velocity.

Figure 12:
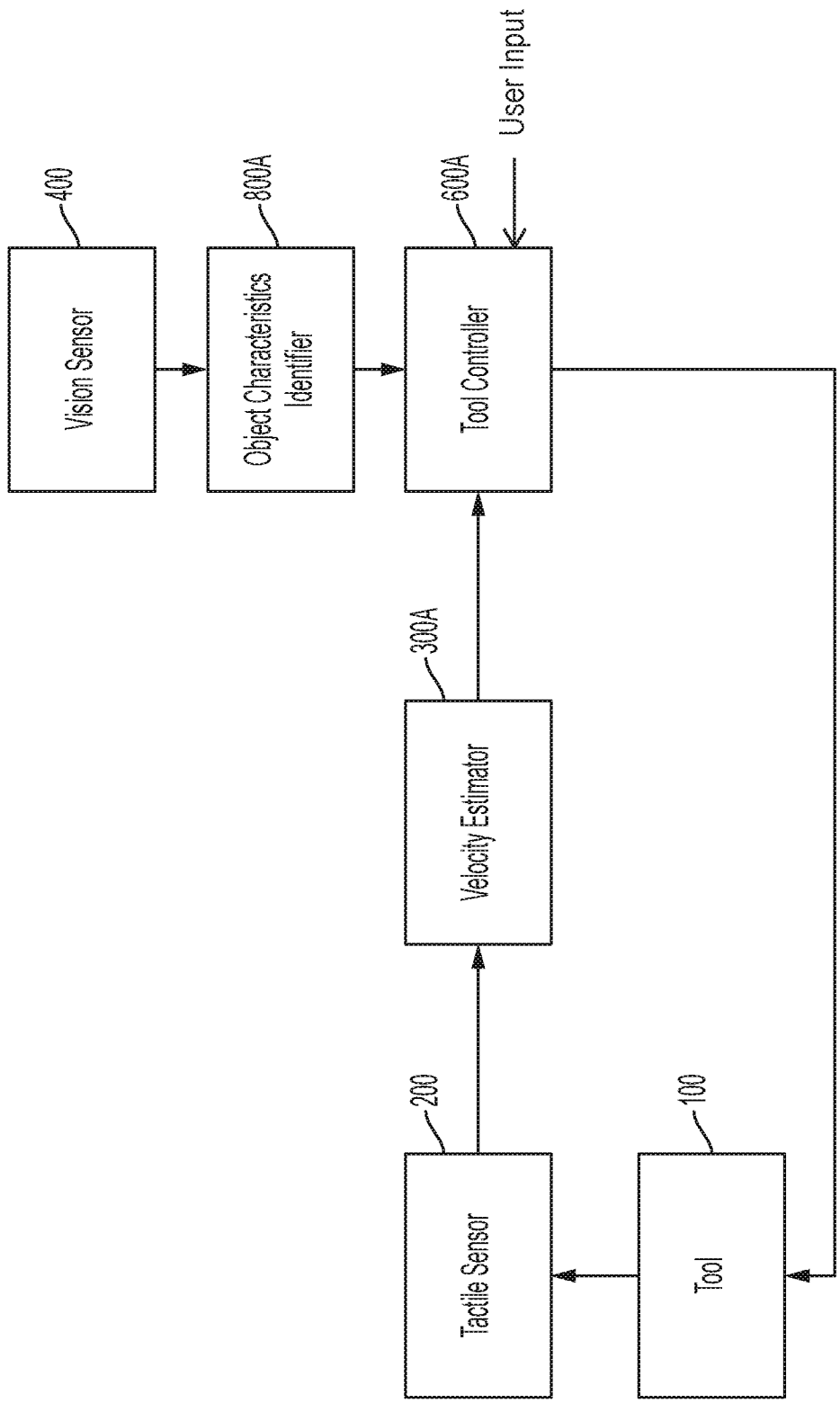
FIG. 12 illustrates a diagram for describing a trained tool control system according to embodiments.

FIG. 12 illustrates a diagram for describing a trained tool control system according to embodiments.

As shown in FIG. 12, a trained tool control system may include a tool 100, a tactile sensor 200, a velocity estimator 300A, a vision sensor 400, a tool controller 600A, and an object characteristics identifier 800A.

The tool 100, the tactile sensor 200, and the vision sensor 400 are configured and operated substantially the same as the tool 100, the tactile sensor 200, and the vision sensor 400 that are described with reference to FIGS. 2, 3, and 9, and therefore duplicate descriptions of the tool 100, the tactile sensor 200, and the vision sensor 400 are omitted.

The velocity estimator 300A and the object characteristics identifier 800A in FIG. 12 are configured and operated substantially the same as the velocity estimator 300 and the object characteristics identifier 800 that are described with reference to FIGS. 3, 5, 6, 9, and 10, other than the loss calculators 320 and 720 being omitted in the velocity estimator 300A and the object characteristics identifier 800A, respectively, and the velocity estimator 300A and the object characteristics identifier 800A not receiving labeled object characteristics which are used for training purposes.

The tool controller 600A in FIG. 12 is configured and operated substantially the same as the tool controller 600 that is described with reference to FIGS. 3, 7, and 9 other than the input of the labeled object velocity in the tool controller 600 being replaced with the input of the estimated object velocity in the tool controller 600A. Additionally, the tool controller 600A may receive a user input indicating object characteristics.

The tool controller 600A may receive the estimated velocity from the velocity estimator 300A. The tool controller 600A may also receive the user input including information of object characteristics through an input interface, such a microphone, a touchpad, or a keyboard, and/or may receive the estimated object characteristics from the object characteristics identifier 800A. The tool controller 600A may generate tool control parameters of the tool 100, including a distance between at least two fingers of the tool 100, based on at least one of the estimated velocity, the estimated object characteristics, the user input of the object characteristics. The tool controller 600A may provide the tool control parameters to the tool 100 so that the tool 100 adjusts the distance between the fingers of the tool 100 according to the tool control parameters and thereby regulates the object velocity to the target velocity.

Figure 13:
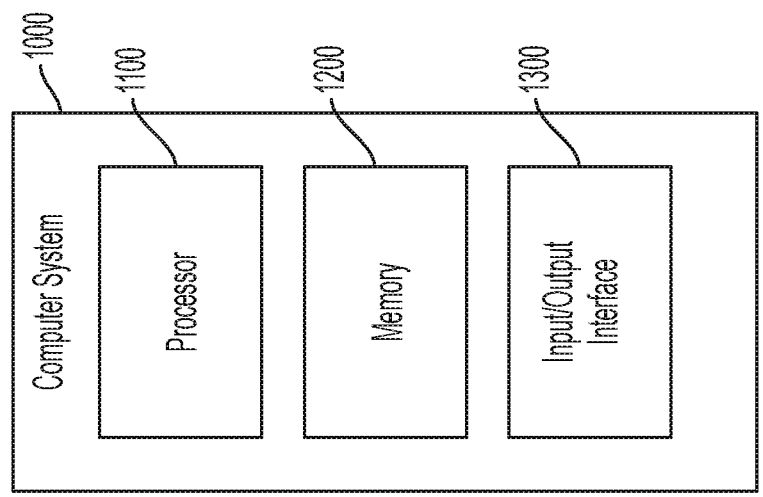
FIG. 13 is a block diagram illustrating a configuration of a computer system according to embodiments of the disclosure.

FIG. 13 is a block diagram illustrating a configuration of a computer system according to embodiments of the disclosure.

As shown in FIG. 13, a computer system 1000 may include a processor 1100, a memory 1200, and an input/output interface 1300.

The processor 1100 may perform overall control of a tool control system and a tool, and may execute one or more programs stored in the memory 1200. The processor 1100 is implemented in hardware, firmware, or a combination of hardware and software. The processor 1100 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 1100 includes one or more processors capable of being programmed to perform a function.

The processor 1100 according to embodiments of the disclosure may perform any one or any combination of operations of the velocity estimator 300, the labeled velocity calculator 500, and the tool controller 600 which are described with reference to FIG. 3, operations of the velocity estimator 300, the labeled velocity calculator 500, the tool controller 600, the object characteristics estimator 700, and the labeled object characteristics identifier 800 which are described with reference to FIG. 9, and operations of the velocity estimator 300A, the tool controller 600A, and the object characteristics identifier 800A which are described with reference to FIG. 12.

The memory 1200 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. The memory 1200 may also include a random access memory (RAM), a read only memory (ROM), and/or another type of dynamic or static storage device (e.g., a flash memory, a magnetic memory, and/or an optical memory).

The memory 1200 may store various data, programs, or applications for driving and controlling the tool 100. A program stored in the memory 1200 may include one or more instructions. A program including one or more instructions or an application stored in the memory 1200 may be executed by the processor 1100.

The input/output interface 1300 may enable the computer system 1000 to communicate with other devices, such as the tool 100, the tactile sensor 200, the vision sensor 400, and the depth sensor 800, via a wired connection, a wireless connection, or a combination of wired and wireless connections.

Figure 14:
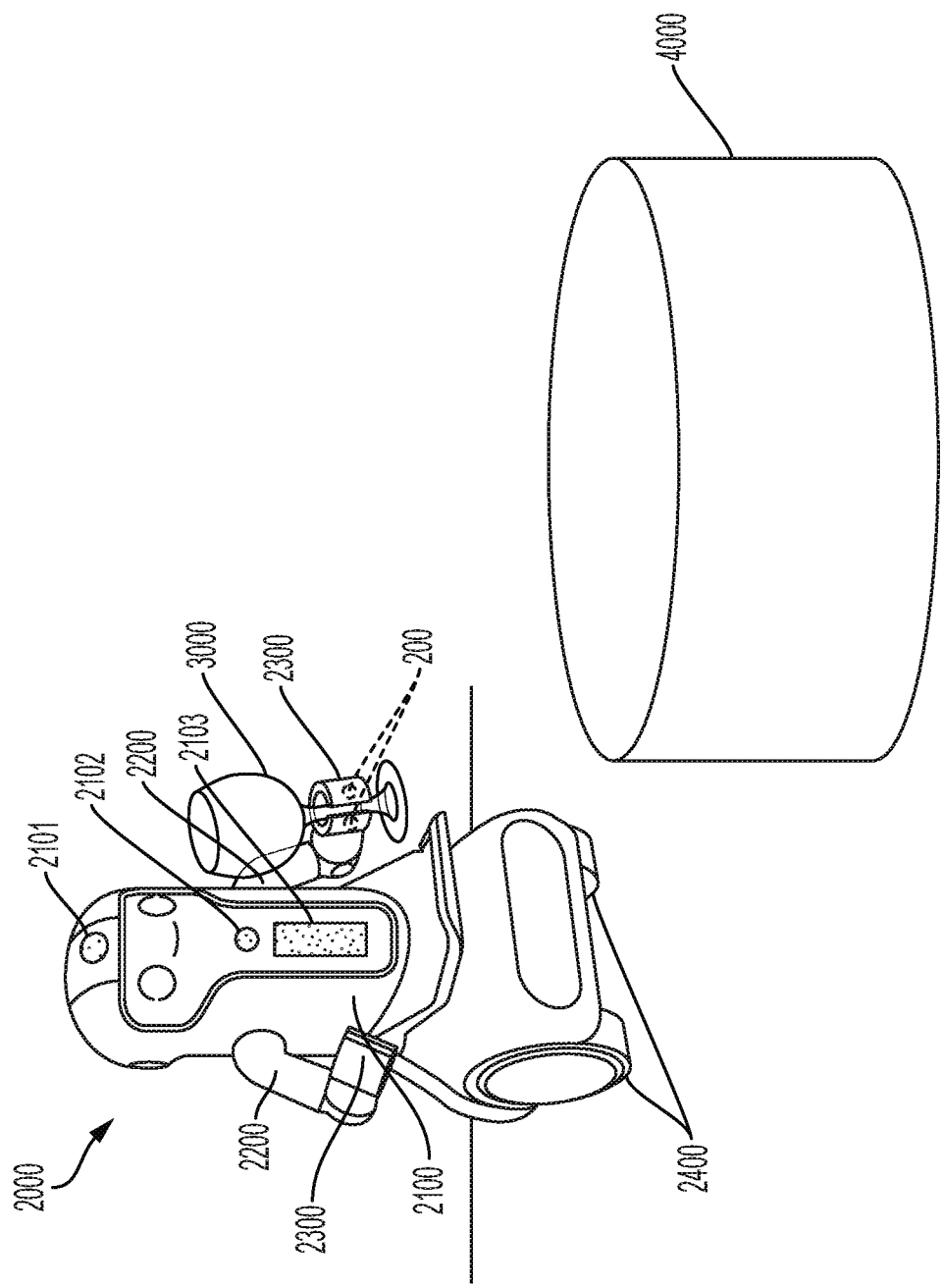
FIG. 14 is a block diagram illustrating a robot and an object controlled by the robot according to embodiments of the disclosure.

FIG. 14 is a block diagram illustrating a service robot performing assigned tasks according to embodiments of the disclosure. The service robot may be a robot butler that is trained to perform household tasks, chores, healthcare duties, or any other activities performed at home.

For example, as shown in FIG. 14, a service robot 2000 may include a body 2100, arms 2200, hands 2300, and wheels 2400. The body 2100 may include a camera 2101, a microphone 2102, and a touchpad 2103. A tactile sensor 200 may be mounted on the hands 2300, for example, two fingers of each of the hands 2300.

The service robot 2000 may move around a designated area (e.g., a house, or a bedroom of the house) using the wheels 2400, and may monitor the designated area through the camera 2101 to perform various tasks assigned by a user.

To carry out the assigned tasks, the service robot 2000 may include the computer system 1000 as shown in FIG. 13. The arms 2200 and the hands 2300 of the service robot 2000 may operate as the tool 100 illustrated in FIGS. 1 and 12, and the hands 2300 may be also referred to as end-effectors or grippers. The camera 2101 may correspond to the vision sensor 400 illustrated in FIG. 12.

With reference to FIGS. 13 and 14, the service robot 2000 may receive tasks through the input/output interface 1300, such as the microphone 2102, the touchpad 2103, and/or a built-in wireless communication module. Also, the service robot 2000 may receive a user's input (e.g., a voice input or a touch input) which indicates characteristics (e.g., shape, fragility, material, texture, and/or size) of an object 300, through input/output interface 1300. The service robot 2000 may pre-store commands for performing tasks in the memory 1200. Examples of the tasks may include various household chores, such as cleaning, organizing, loading a fridge, loading a shelf, loading a dishwasher, and placing an item on a table, and the like.

For example, when an assigned task is placing an object at a designated location, the memory 1200 may store a predetermined activation velocity and a predetermined target velocity of an object to be held, released, and placed by the service robot 2000. In order to carry out the assigned task, the tactile sensor 200 of the service robot 2000 may measure impedance, static pressure, and dynamic pressure, as tactile sensing data, from the hands 2300, while the service robot 2000 is holding the object (e.g., a wineglass) 3000 with one of the hands 2300 and then gradually opening the hand 2300 to place the object 3000 on a table 4000. At the same time, the camera 2102 may capture an image of the object 3000 while the service robot 2000 is sliding the object 3000 downward across the inner surface of the fingers of the hand 2300, to place the object on the table 4000. The processor 1100 of the service robot 2000 may estimate an in-grasp sliding velocity and characteristics of the object 3000 based on the tactile sensing data and the image of the object 3000, by using one or more neural networks 311, 310A-310C, and 711. The processor 110 may generate tool control parameters (e.g., a distance between two fingers of the hand 2300 holding the object 3000) based on at least one of the estimated velocity of the object 3000, the estimated characteristics of the object 3000, and the user's input regarding the object characteristics, so as to regulate the velocity of the object 2300 to a target velocity. For example, in a pre-sliding stage which begins when the object 2300 has a zero velocity and ends when the velocity of the object 2300 reaches an activation velocity or a predetermined percentage of the activation velocity, the processor 1100 may control the velocity of the object 2300 based on the estimated velocity, according to equation (1). In a sliding stage which begins after the pre-sliding stage and ends when the velocity of the object 2300 reaches the target velocity, the processor 110 may control the velocity of the object 2300 based on the estimated velocity, according to equations (2) and (3).

According to embodiments of the present disclosure, the service robot 2000 may gently place an object at a designated location by accurately estimating an in-grasp sliding velocity of the object using neural networks that are trained based on tactile sensing data, even without knowledge of the object's physical properties. Also, embodiments of the present disclosure provide a neural network that is trained to estimate characteristics of the object and enable a tool controller to regulate the in-grasp sliding velocity of the object based on the estimated object characteristics, and thereby to control the tool with a high precision.

While the embodiments of the disclosure have been described with reference to the figures, it will be understood by those of ordinary skill in the art that various changes in form and details may be made therein without departing from the spirit and scope as defined by the following claims.

What is claimed is:

1. A tool control system comprising:
   a tactile sensor configured to, when a tool holds a target object and slides the target object downward across the tool, obtain tactile sensing data from the tool;
   one or more memories configured to store a target velocity and computer-readable instructions; and
   one or more processors configured to execute the computer-readable instructions to:
   receive the tactile sensing data from the tactile sensor;
   estimate a velocity of the target object based on the tactile sensing data, by using one or more neural networks that are trained based on a training image of an sample object captured while the sample object is sliding down; and
   generate a control parameter of the tool based on the estimated velocity and the target velocity.

2. The tool control system of claim 1, wherein the tactile sensing data comprises at least one of an impedance value of an electrode mounted on the tool, a static pressure value that represents a force exerted to the tool by the target object, and a dynamic pressure value that represents a vibration that occurs in the tool when the target object slides across the tool.

3. The tool control system of claim 1, wherein the tool comprises two fingers configured to hold and slide the target object downward over the two fingers, and
   wherein the control parameter is a command value indicating a distance between the two fingers of the tool.

4. The tool control system of claim 1, wherein the tactile sensing data comprises an impedance value of an electrode mounted on the tool, a static pressure value that represents a force exerted to the tool by the target object, and a dynamic pressure value that represents a vibration that occurs in the tool when the target object slides across the tool, and
   wherein the one or more neural networks comprise:
   a first neural network configured to process the impedance value,
   a second neural network configured to process the static pressure value;
   a third neural network configured to process the dynamic pressure value;
   a concatenation layer configured to combine the processed impedance value, the processed the static pressure value, and the processed dynamic pressure value; and one or more fully connected layers configured to output the estimated velocity based on a combination of the processed impedance value, the processed the static pressure value, and the processed dynamic pressure value.

5. The tool control system of claim 4, wherein the one or more neural networks further comprise:
a max pooling layer provided between the third neural network and the concatenation layer to down-sample the processed dynamic pressure value, and output a down-sampling result of the processed dynamic pressure value to the concatenation layer.

6. The tool control system of claim 1, wherein the tactile sensor comprises:
an impedance sensor comprising a plurality of sensing electrodes and configured to detect an impedance value of each of the plurality of sensing electrodes; and
a pressure sensor configured to detect a static pressure value that represents a force exerted to the tool by the target object, and a dynamic pressure value that represents a vibration that occurs in the tool when the target object slides across the tool.

7. The tool control system of claim 1, wherein the one or more memories are further configured to store an activation velocity that is less than the target velocity, and
the one or more processors are further configured execute the computer-readable instructions to:
generate the control parameter of the tool based on the estimated velocity and the activation velocity, in a pre-sliding stage starting from a first point in time where the estimated velocity of the target object is zero, and ending at a second point in time where the estimated velocity of the target object becomes a predetermined percentage of the activation velocity; and
generate the control parameter of the tool based on the estimated velocity and the target velocity, in a sliding stage starting from the second point in time, and ending a third point in time where the estimated velocity of the target object becomes the target velocity.

8. The tool control system of claim 1, further comprising a vison sensor configured to capture an image of the target object;
wherein the one or more processors are further configured execute the computer-readable instructions to:
estimate a physical property of the target object based on the captured image of the target object, by using another neural network that is trained based on either one or both of depth information of the sample object and tactile sensing information of the sample object; and
generate the control parameter of the tool based on the estimated physical property of the target object, the estimated velocity of the target object, and the target velocity.

9. The tool control system of claim 8, wherein the physical property of the target object comprises at least one of shape, texture, material, fragility, strength, and size of the target object.

10. The tool control system of claim 1, wherein the tool comprises at least one of a robot end-effector, a robot gripper, and a robot tweezer.

11. The tool control system of claim 1, wherein the one or more processors are further configured execute the computer-readable instructions to:
transmit, to the tool, the control parameter that enables the tool to gradually increase a distance between two fingers of the tool based on the control parameter, until the estimated velocity becomes the target velocity.

12. A tool control method comprising:
obtaining tactile sensing data from a tool when the tool holds a target object and slides the target object downward across the tool;
estimating a velocity of the target object based on the tactile sensing data, by using one or more neural networks that are trained based on a training image of an sample object captured while the sample object is sliding down; and
generating a control parameter of the tool based on the estimated velocity and a predetermined target velocity.

13. The tool control method of claim 12, wherein the tactile sensing data comprises at least one of an impedance value of an electrode mounted on the tool, a static pressure value that represents a force exerted to the tool by the target object, and a dynamic pressure value that represents a vibration that occurs in the tool when the target object slides across the tool.

14. The tool control method of claim 12, wherein the control parameter is a command value indicating a distance between two fingers of the tool configured to hold and slide the target object downward.

15. The tool control method of claim 12, wherein the tactile sensing data comprises at least one of an impedance value, a static pressure value, and a dynamic pressure value detected from the tool, and
wherein the one or more neural networks comprise a first neural network, a second neural network, and a third neural network, and
the estimating the velocity of the target object comprises:
processing the impedance value, the static pressure value, and the dynamic pressure value, through the first neural network, the second neural network, and the third neural network, respectively; and
obtaining the estimated velocity by processing a combination of the processed impedance value, the processed the static pressure value, and the processed dynamic pressure value, through one or more fully connected layers.

16. The tool control method of claim 15, wherein the estimating the velocity of the target object further comprises:
down-sampling the processed dynamic pressure value to be combined with the processed impedance value and the processed static pressure value, so that the estimated velocity is obtained from the combination of the down-sampled processed dynamic pressure value, the processed impedance value, and the processed static pressure value.

17. The tool control method of claim 12, wherein the generating the control parameter of the tool comprises:
entering a pre-sliding stage at a first point in time where the estimated velocity of the target object is zero;
generating the control parameter of the tool based on the estimated velocity and a predetermined activation velocity that is less than the predetermined target velocity, in the pre-sliding stage starting until a second point in time where the estimated velocity of the target object becomes the predetermined activation velocity;
transitioning from the pre-sliding stage to a sliding stage at the second point in time; and
generating the control parameter of the tool based on the estimated velocity and the predetermined target velocity, in the sliding stage until the estimated velocity of the target object becomes the predetermined target velocity.

18. The tool control method of claim 12, further comprising capturing an image of the target object;
- estimating a physical property of the target object based on the captured image of the target object, by using another neural network that is trained based on either one or both of depth information of the sample object and tactile sensing information of the sample object; and
- generating the control parameter of the tool based on the estimated physical property of the target object, the estimated velocity of the target object, and the predetermined target velocity.

19. The tool control method of claim 18, wherein the physical property of the target object comprises at least one of shape, texture, material, fragility, strength, and size of the target object.

20. The tool control method of claim 12, further comprising:
- transmitting, to the tool, the control parameter that enables the tool to gradually increase a distance between two fingers of the tool based on the control parameter, until the estimated velocity becomes the predetermined target velocity.

* * * * *